(12) United States Patent
Dybdal et al.

(10) Patent No.: US 8,804,808 B1
(45) Date of Patent: Aug. 12, 2014

(54) DYNAMIC EQUALIZATION SYSTEMS AND METHODS FOR USE WITH A RECEIVER FOR A MULTIPATH CHANNEL

(71) Applicant: The Aerospace Corporation, El Segundo, CA (US)

(72) Inventors: Robert B. Dybdal, Palos Verdes, CA (US); Christopher J. Clark, Hermosa Beach, CA (US); Flavio Lorenzelli, Los Angeles, CA (US)

(73) Assignee: The Aerospace Corporation, El Segundo, CA (US)

( * ) Notice: Subject to any disclaimer, the term of this patent is extended or adjusted under 35 U.S.C. 154(b) by 0 days.

(21) Appl. No.: 14/154,968

(22) Filed: Jan. 14, 2014

(51) Int. Cl.
*H04L 27/01* (2006.01)
(52) U.S. Cl.
USPC .......................................................... 375/232
(58) Field of Classification Search
CPC ............ G06F 17/10; H04B 1/00; H04B 1/10; H04B 1/74; H04B 17/00; H04K 1/10; H04L 1/02; H04L 27/01; H04L 27/06; H04L 27/28; H01Q 21/06
USPC .......... 370/210, 291; 375/229–236, 316, 340, 375/343, 350
See application file for complete search history.

(56) References Cited

U.S. PATENT DOCUMENTS

| 5,815,529 | A | | 9/1998 | Wang | |
|---|---|---|---|---|---|
| 6,031,882 | A | * | 2/2000 | Enge et al. | 375/343 |
| 6,219,334 | B1 | | 4/2001 | Sato et al. | |
| 6,552,995 | B1 | | 4/2003 | Nakada | |
| 7,099,270 | B2 | | 8/2006 | Yamaguchi | |
| 7,173,990 | B2 | | 2/2007 | Kim et al. | |
| 7,212,569 | B1 | | 5/2007 | Clark | |
| 8,050,336 | B2 | | 11/2011 | Bocquet | |
| 8,155,218 | B2 | | 4/2012 | Hong et al. | |
| 8,199,851 | B1 | | 6/2012 | Dybdal et al. | |
| 8,259,857 | B2 | | 9/2012 | Dybdal et al. | |
| 8,462,879 | B2 | | 6/2013 | Dybdal et al. | |
| 2008/0260014 | A1 | * | 10/2008 | Yang et al. | 375/232 |
| 2009/0225823 | A1 | * | 9/2009 | Chen et al. | 375/230 |
| 2010/0195711 | A1 | * | 8/2010 | Hasan et al. | 375/233 |

(Continued)

OTHER PUBLICATIONS

Bottomley et al., "A Generalized Rake Receiver for Interference Suppression," *IEEE Journal on Selected Areas in Communications*, 18(8):1536-1545 (2000).

(Continued)

*Primary Examiner* — Sam K Ahn
*Assistant Examiner* — Shawkat M Ali
(74) *Attorney, Agent, or Firm* — Jones Day; Jaime D. Choi

(57) ABSTRACT

A dynamic equalization system and method for use with a receiver is provided. The receiver may include an antenna for receiving a signal having multipath signal components and a digitizer for obtaining and digitizing the received signal and multipath signal components. The digitized signal segment and multipath signal components may be discretized into signal segments of length n. Channel parameters of each of the discrete signal segments may be analyzed and locked to, and a time-domain representation of the analyzed channel parameters may be output. Each time-domain representation may be Fourier transformed into a frequency-domain representation, based upon which equalization parameters to equalize the multipath signal components for each of the analyzed channel parameters may be determined. The equalization parameters may be applied to corresponding signal segments of the digitized signal and multipath signal components so as to equalize the multipath signal components.

16 Claims, 18 Drawing Sheets

(56) References Cited

U.S. PATENT DOCUMENTS

2011/0200089 A1* 8/2011 Umeda et al. .............. 375/232
2011/0260920 A1 10/2011 Dybdal et al.
2011/0268169 A1* 11/2011 Mitsugi et al. .............. 375/226

OTHER PUBLICATIONS

Calhoun, "Third Generation Wireless Systems, vol. 1, Post-Shannon Signal Architectures,", Artech House, Boston. pp. 344-376 (2003).

Jiang et al., "Multiuser MIMO-OFDM for Next-Generation Wireless Systems," *Proceedings of the IEEE*, 95(7):1430-1469 (2007).

Johnson et al., "Blind Equalization Using the Constant Modulus Criterion: A Review," *Proceedings of the IEEE*, 86(10):1927-1950 (1998).

Proakis et al., "Contemporary Communication Systems Using MATLAB® and Simulink®, Second Edition," Brooks/Cole Publishing Co., St. Paul, MN, pp. 268-273 (2004).

\* cited by examiner

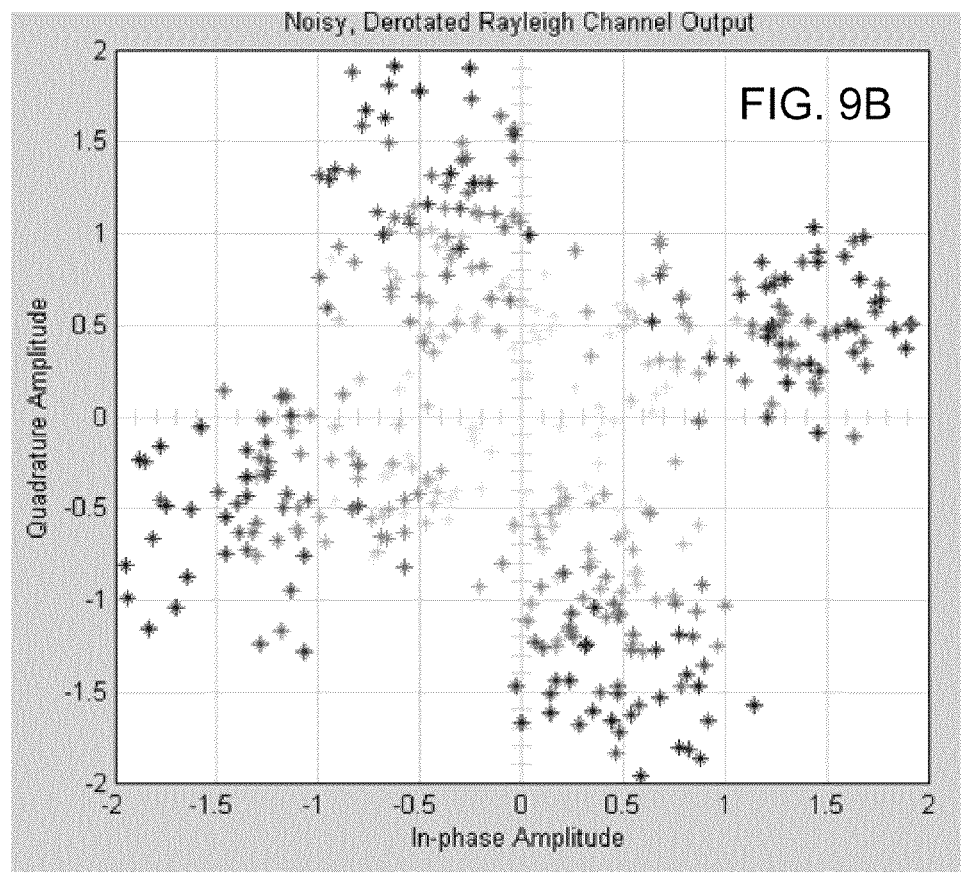
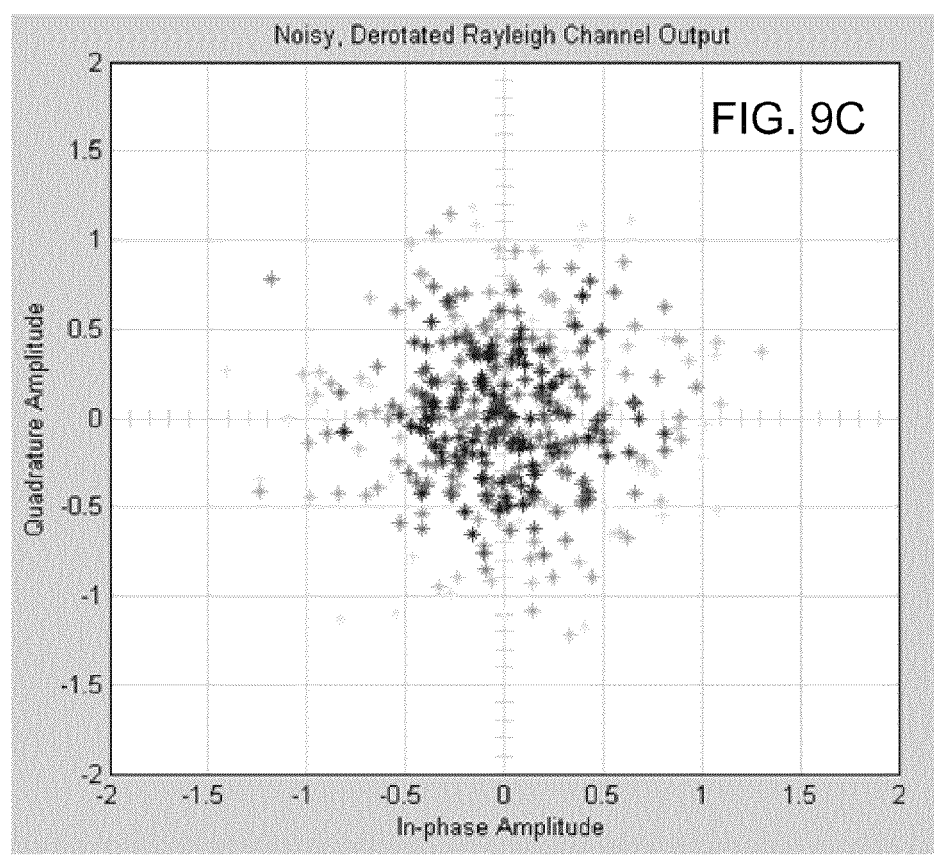

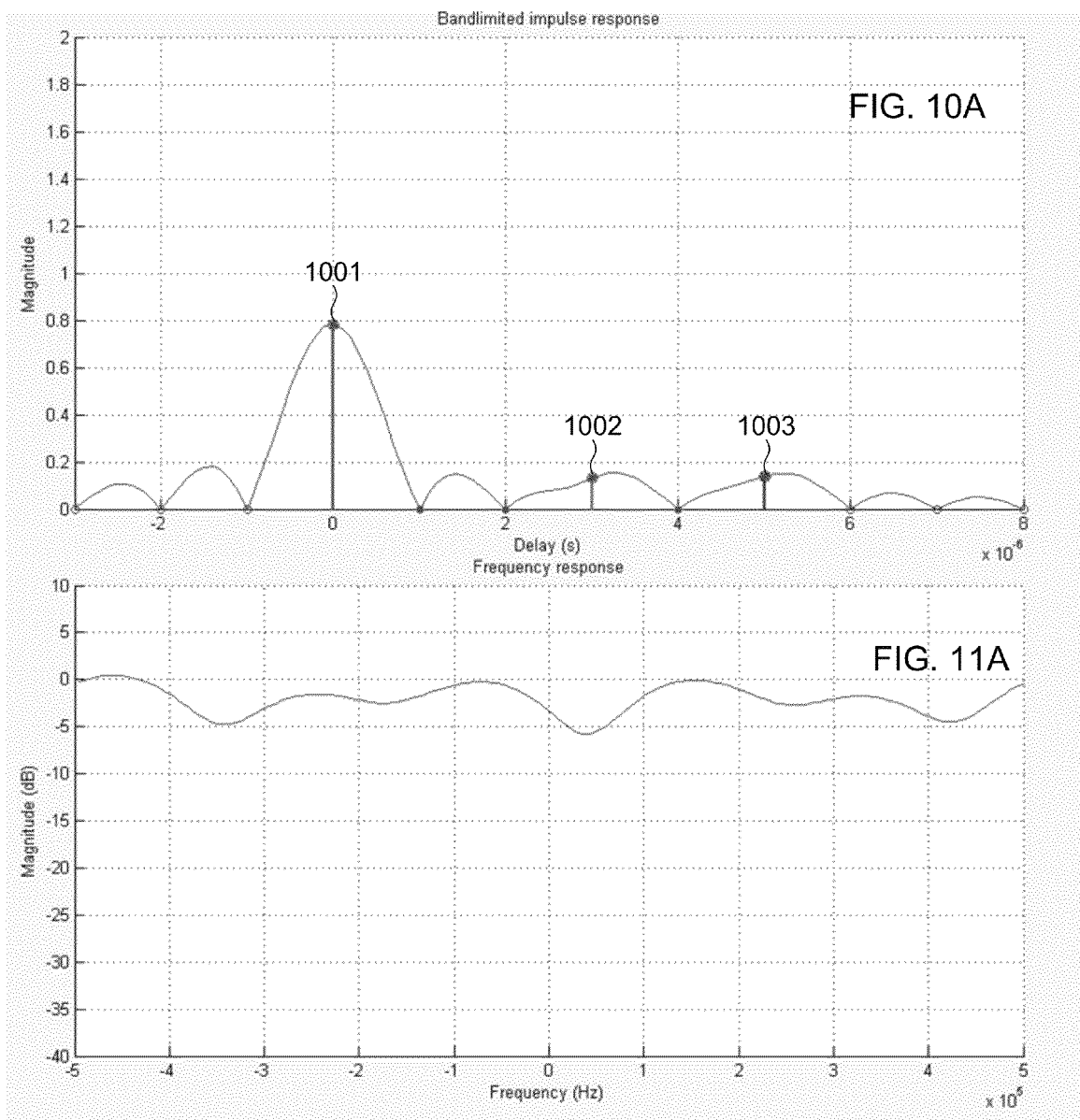

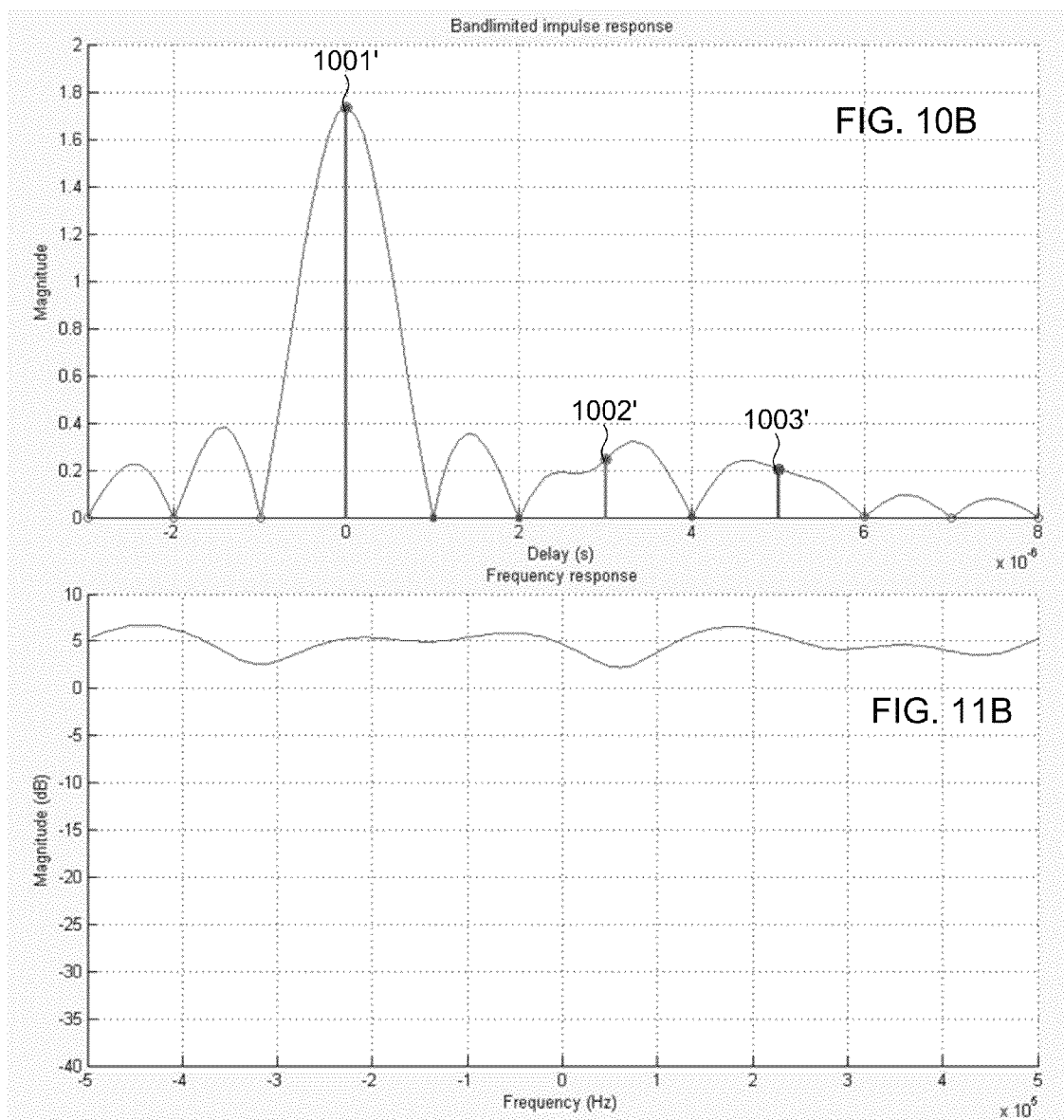

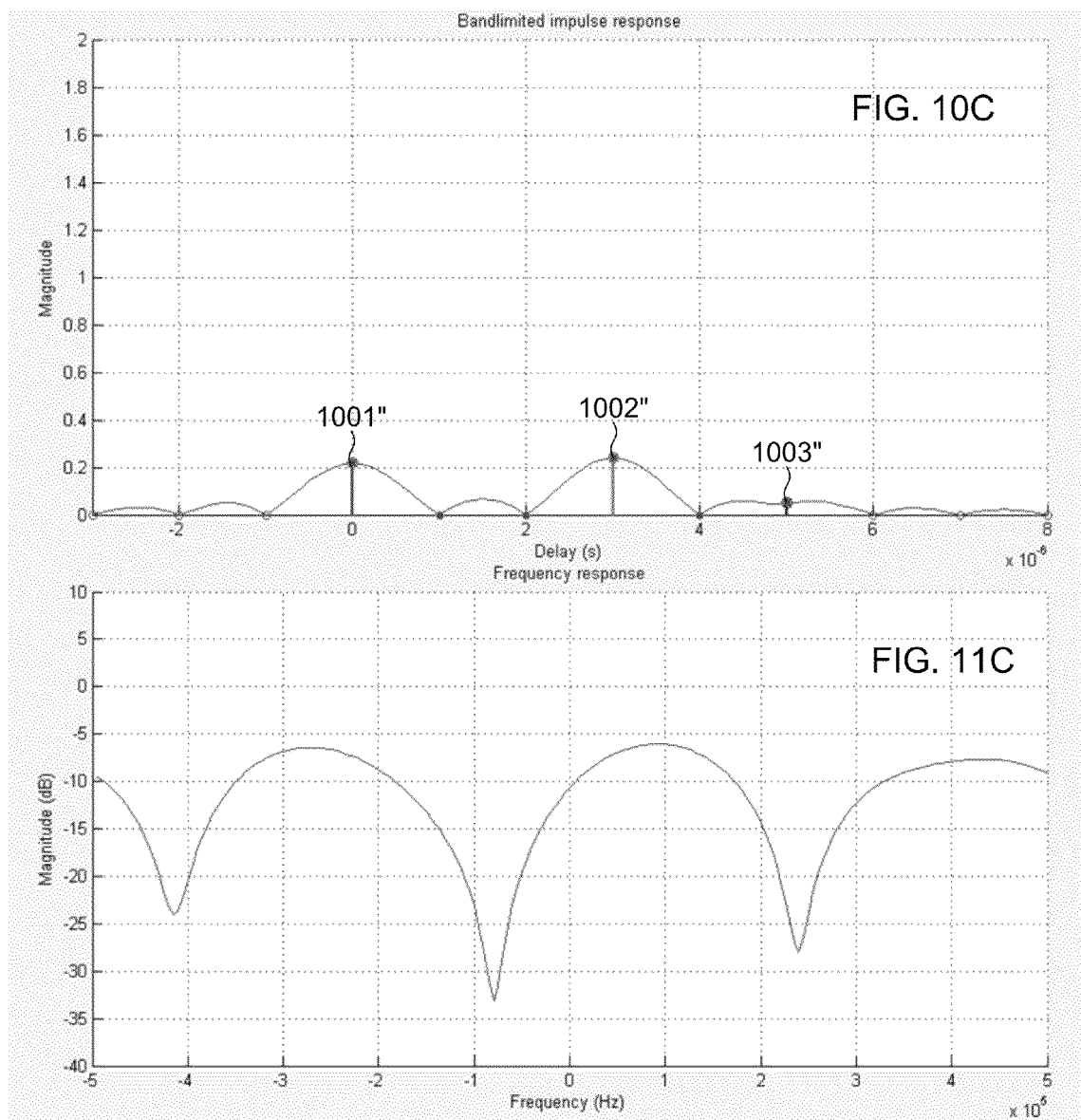

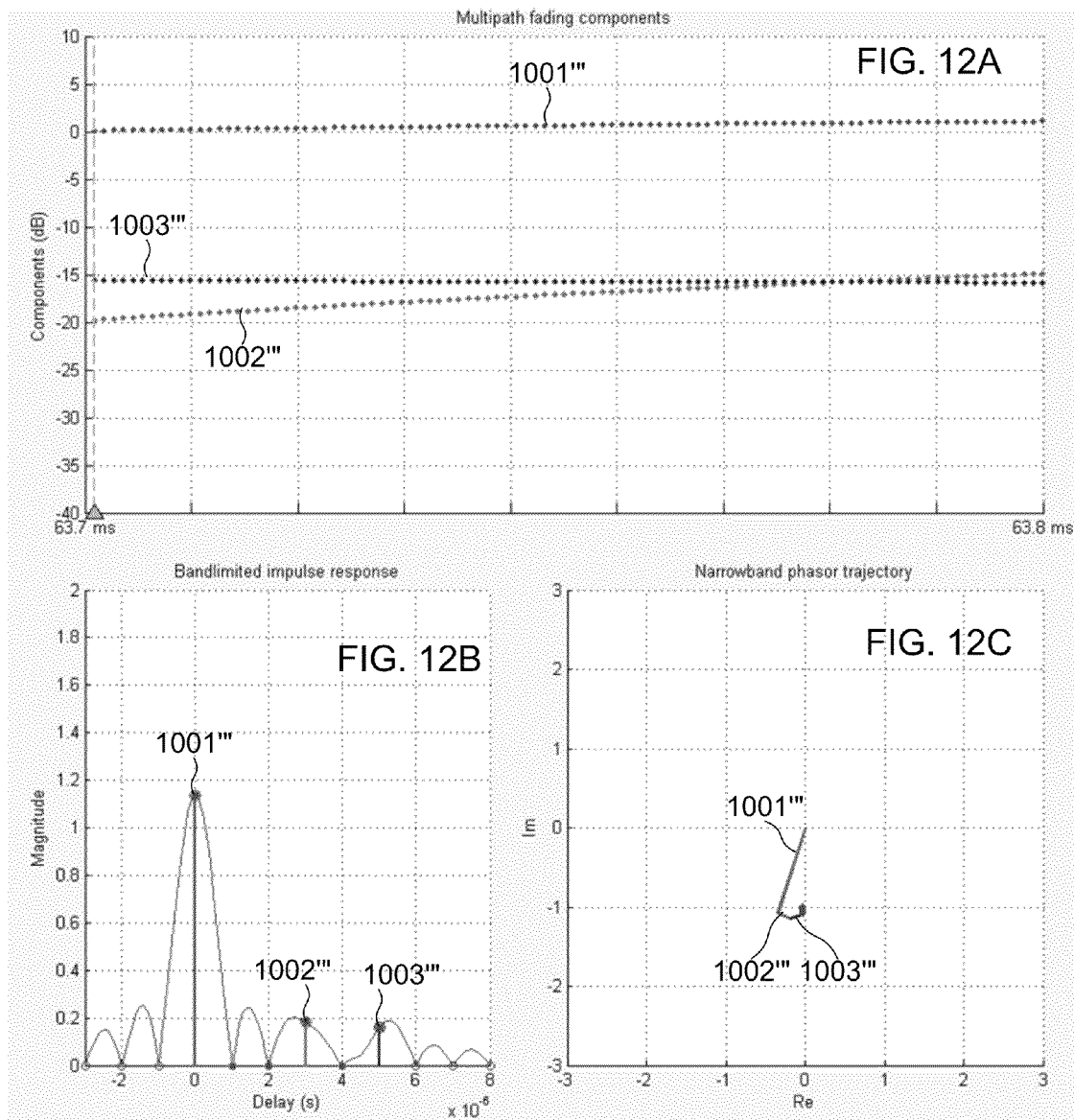

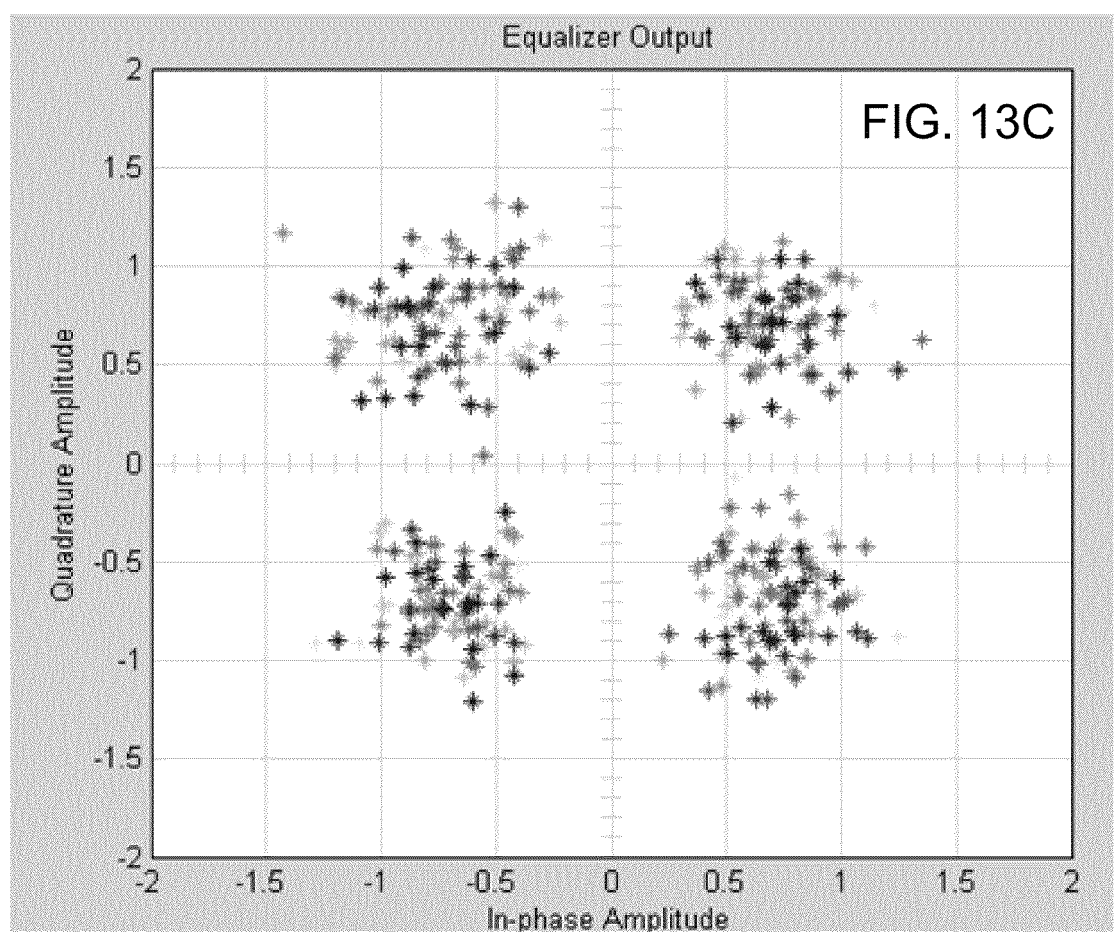

DYNAMIC EQUALIZATION SYSTEMS AND METHODS FOR USE WITH A RECEIVER FOR A MULTIPATH CHANNEL

FIELD

This application relates to equalization systems and methods for use with a receiver for a multipath channel.

BACKGROUND

As is known in the art, multipath interference may occur when transmitting a signal from a transmitting antenna to a receiving antenna via a communication channel. More specifically, even if the transmitting antenna directly transmits a main component of the signal to the receiving antenna, other components of the transmitted signal may reflect off of buildings, moving or stationary objects, or the terrain, collectively referred to as "multipath sources," before arriving at the receiving antenna. These multipath components may interfere with the main signal component at the receiving antenna, and may be delayed in time relative to the main signal component as well as to each other, and may have weights that differ from one another, and thus may make it difficult to demodulate the main signal component so as to obtain the information that it carries. Additionally, if the transmitting or receiving antenna is in motion, e.g., is in a vehicle or a communications satellite, then the multipath signal components may vary over time as the transmitting and receiving antennas move relative to one another and relative to the multipath sources. Moreover, such motion may Doppler-shift some of the multipath signal components, further increasing the difficulty of demodulating the main signal. A communications channel experiencing interference from multipath signal components may be more succinctly referred to as a "multipath channel."

A variety of equalizers have been developed to attempt to address multipath signal components using adaptive filtering. One such technique, referred to in the art as an "adaptive zero-forcing equalizer receiver," is schematically illustrated in FIG. 1. As illustrated in FIG. 1, the receiver 100 includes adaptive equalizer 110, receive antenna 120, signal digitizer and conditioner 130, and demodulator 140. Adaptive equalizer 110 includes fixed tapped delay line circuitry having a first plurality of spaced taps 111, a second plurality of spaced taps 112, multipliers (circles with an "X" inside), summing circuitry (circles with a sigma "$\Sigma$" inside), subtractor 113, and detector 114. The value $y_k$ denotes the equalizer internal signal value at time instant k, the value $\varepsilon_k$ denotes the equalizer internal error signal value at time instant k, and $a_k$ denotes the equalizer output signal at time instant k.

Receive antenna 120 is configured to receive a signal having multipath signal components, e.g., from a transmitting antenna (not shown) via a multipath channel. Signal digitizer and conditioner obtains and digitizes the signal and multipath signal components received by the antenna, and also may filter or otherwise condition the signal and multipath signal components. The digitized signal, which varies as a discrete function of time t, then is provided as input "Input(t)" to adaptive equalizer 110. Taps 111, 112 of adaptive equalizer 110 are divided over the anticipated time delay spread of the multipath signal components, and each operates on a single signal segment that is separated from other signal segments by the time delay value T. During operation, the equalizer illustrated in FIG. 1 may adaptively vary the relative weights of the different time signal segments over time so as to force the error signal generated by subtractor 113 to zero, and thus so as to align the main signal contribution with the multipath signal components in a coherent manner, and reduce the amount of multipath interference in the output signal provided to demodulator 140. More specifically, the second plurality of spaced taps 112 are used together with error signal $\varepsilon_k$ to provide feedback for a relative weight adjustment applied to the output of the first plurality of spaced taps 111. For additional information about zero-forcing equalizers, see Proakis, "Contemporary Communication Systems Using MATLAB," 2nd Edition, ISBN 0-534-40617-3, the entire contents of which are incorporated by reference herein. In addition to the zero-forcing equalizer example described, adaptive weighing of the time delay taps may be derived using a minimum mean-square error (MSE) criteria such as known in the art.

Note that at any given moment in FIG. 1, some of the multipath signal components may be relatively close in time to one of the tap delays, while others may be relatively far in time from any of the tap delays. If a given multipath signal component delay is relatively close to a tap delay, then that component may be satisfactorily equalized. However, if the multipath signal component delay is relatively far in time from any of the tap delays, then that component may be insufficiently equalized, thus degrading demodulation of the signal. As is known in the art, increasing the number of taps may facilitate equalization over a greater bandwidth. Increasing the equalizer bandwidth by 2 requires decreasing the time duration for each tap by a factor of 2 which doubles the total number of taps. As such, the complexity of the adaptive equalizer receiver may increase significantly based on increases in the desired equalization bandwidth. Additionally, for circumstances where the transmitting and receiving antennas and multipath sources are moving relative to one another, the delays of each of the multipath signal components also may move relative to the tap delays. Accordingly, the performance of adaptive equalizer receiver 100 may be limited by the ability of multipliers, summing circuitry, and any algorithms operating therein, to keep up with dynamic changes in the time delayed signal components generated by the multipath channel.

The adaptive equalizer receiver is a technique that may be generally applied to received waveforms with multipath. For CDMA received waveforms, RAKE receivers are typically used. For additional information about adaptive equalizer receivers, as well as RAKE and other previously known techniques for addressing multipath signal components, see Calhoun, "Third Generation Wireless Systems, Volume 1, Post-Shannon Signal Architectures," Artech House, Boston, pages 344-376 (2003), the entire contents of which are incorporated by reference herein.

Other approaches to addressing multipath interference may rely on spatial diversity, such as multiple-input and multiple-output (MIMO) techniques, in which both the transmit side and the receive side use multiple antennas. However, MIMO implementations may have limited application because multiple transmitters and receivers with sufficient spatial diversity may be incompatible with some practical link geometries. Other techniques, such as used with digital video broadcasting (DVB) standards may use training or pilot signals into the block coding so as to facilitate synchronization and to reduce the effects of multipath interference. Other approaches may utilize blind implementation techniques based on maintaining the known spectral characteristics of the transmitted signal. However, such techniques may rely upon the receive side having a relatively large amount of a priori knowledge about the transmitted signal, thus limiting flexibility in the transmitted signals.

Thus, what is needed is an improved technique for reducing the effects of multipath signal components.

SUMMARY

Embodiments of the present invention provide dynamic equalization systems and methods for use with a receiver for a multipath channel.

Under one aspect of the present invention, a dynamic equalization system for use with a receiver is provided. The receiver may include an antenna configured to receive a signal having multipath signal components, and a digitizer configured to obtain and digitize the signal and multipath signal components received by the antenna. The dynamic equalization system may include an equalization estimator configured to receive the digitized signal and multipath signal components from the digitizer, and an equalizer. The equalization estimator may include acquisition circuitry configured to sequentially output discrete signal segments of length n of the digitized signal and multipath signal components. The equalization estimator also may include channel parameter loop circuitry configured to sequentially analyze and lock to one or more channel parameters of the corresponding signal segment, and to output a time-domain representation of each of the analyzed channel parameters for the corresponding signal segment. The equalization estimator also may include Fourier transform circuitry configured to sequentially Fourier transform each time-domain representation into a frequency-domain representation for each of the analyzed channel parameters for the corresponding discrete signal segment, and to output the frequency-domain representation. The equalization estimator further may include an equalization processor configured to determine and output equalization parameters to equalize the multipath signal components for each of the analyzed channel parameters based on the frequency-domain representations. The equalizer may be configured to sequentially receive the discrete signal segments of the digitized signal and multipath signal components from the acquisition circuitry, to sequentially receive the equalization parameters from the equalization processor, to sequentially apply the equalization parameters to the corresponding signal segments so as to equalize the multipath signal components, and to output the equalized signal segments.

In some embodiments, the equalization processor further is configured to sequentially determine and output the analyzed channel parameters for an earliest-in-time signal component corresponding to the signal based on the frequency-domain representations. The system further may include circuitry configured to sequentially receive the corresponding equalized signal segments from the equalizer and the analyzed channel parameters for the earliest-in-time signal component from the equalization processor and to align the earliest-in-time signal component with the equalized multipath signal components within the equalized signal segments based thereon. The circuitry may be configured to sequentially demodulate the aligned, equalized signal segments so as to obtain a time-domain representation corresponding to the signal. The equalization processor may be configured to determine the analyzed channel parameters for the earliest-in-time signal for a signal segment based on a position or amplitude of those parameters in the frequency-domain representation for that signal segment.

In some embodiments, the channel parameters that the channel parameter loop circuitry is configured to analyze and lock to include one or more of phase, delay, and carrier frequency.

In some embodiments, the equalization processor is configured to determine the equalization parameters for each of the analyzed channel parameters of a signal segment by calculating a filter that equalizes the multipath signal components for each of the analyzed channel parameters in that signal segment. The equalizer may be configured to apply the filter to the signal segment.

The channel parameter loop circuitry may be configured to analyze and lock to the one or more channel parameters based on a priori known information about the signal.

The signal may include a sequence of blocks each having a preamble and data, wherein n is equal to the length of each of the blocks.

Under another aspect of the present invention, a dynamic equalization method is provided for use with a receiver. The receiver may include an antenna configured to receive a signal having multipath signal components, and a digitizer configured to obtain and digitize the signal and multipath signal components received by the antenna. The method may include receiving the digitized signal segment and multipath signal components from the digitizer, and sequentially outputting discrete signal segments of length n of the digitized signal and multipath signal components. The method also may include sequentially analyzing and locking to one or more channel parameters of the discrete signal segments, and outputting a time-domain representation of the analyzed channel parameters for each signal segment. The method also may include sequentially Fourier transforming each of the time-domain representations into a frequency-domain representation. The method also may include, based on the frequency-domain representations, sequentially determining equalization parameter to equalize the multipath signal components for each of the analyzed channel parameters. The method also may include sequentially applying the equalization parameters to corresponding signal segments of the digitized signal and multipath signal components so as to equalize the multipath signal components.

Some embodiments further include, based on the frequency-domain representations, sequentially determining the analyzed channel parameters for an earliest-in-time signal component channel parameters corresponding to the signal. Some embodiments further include sequentially aligning the earliest-in-time signal component with equalized multipath signal components based on the analyzed channel parameters for the earliest-in-time signal component. Some embodiments further include sequentially demodulating the aligned, equalized signal segments so as to obtain a time-domain representation corresponding to the signal. In some embodiments, the analyzed channel parameters for the earliest-in-time signal for a signal segment are determined based on a position or amplitude of those parameters in the frequency-domain representation for that signal segment.

In some embodiments, the analyzed channel parameters include one or more of phase, delay, and carrier frequency.

In some embodiments, the equalization parameters for each of the analyzed channel parameters of a signal segment are determined by calculating a filter that equalizes the multipath signal components for each of the analyzed channel parameters in that signal segment. Applying the equalization parameters to the signal segment may include applying the filter to the signal segment.

The one or more channel parameters may be analyzed and locked to based on a priori known information about the signal.

The signal may include a sequence of blocks each having a preamble and data, wherein n is equal to the length of each of the blocks.

BRIEF DESCRIPTION OF DRAWINGS

FIGS. 9A-9C are plots of the in-phase and quadrature amplitudes of the QPSK-modulated signal of FIG. 7 for multiple time points, following transmission through a simulated multipath channel having both additive white Gaussian noise (AWGN) and Rayleigh fading during the process flow of FIG. 5.

FIGS. 10A-10C are time-domain plots for different signal segments of the QPSK-modulated signal of FIG. 7 following transmission through a simulated multipath channel having both AWGN and Rayleigh fading during the process flow of FIG. 5.

FIGS. 11A-11C are frequency-domain plots for different signal segments of the QPSK-modulated signal of FIG. 7 following transmission through a simulated multipath channel having both AWGN and Rayleigh fading during the process flow of FIG. 5.

FIG. 12A is a time-domain plot of the amplitudes of the main signal and multipath signal components of the QPSK-modulated signal of FIG. 7 for multiple time points, following transmission through a simulated multipath channel having both AWGN and Rayleigh fading during the process flow of FIG. 5.

FIG. 12B is a time-domain plot for another signal segment of the QPSK-modulated signal of FIG. 7 following transmission through a simulated multipath channel having both AWGN and Rayleigh fading during the process flow of FIG. 5.

FIG. 12C is a plot of the real and imaginary phase components of the main signal and multipath signal components of the QPSK-modulated signal of FIG. 7 for multiple time points, following transmission through a simulated multipath channel having both AWGN and Rayleigh fading during the process flow of FIG. 5.

FIGS. 13A-13C are plots of the in-phase and quadrature amplitudes of the QPSK-modulated signal of FIG. 7 for multiple time points, following transmission through a simulated multipath channel having both additive white Gaussian noise (AWGN) and Rayleigh fading and subsequent dynamic equalization using the process sub-flow of FIG. 6, according to one illustrative embodiment of the present invention.

DETAILED DESCRIPTION

Overview

Figure 1:
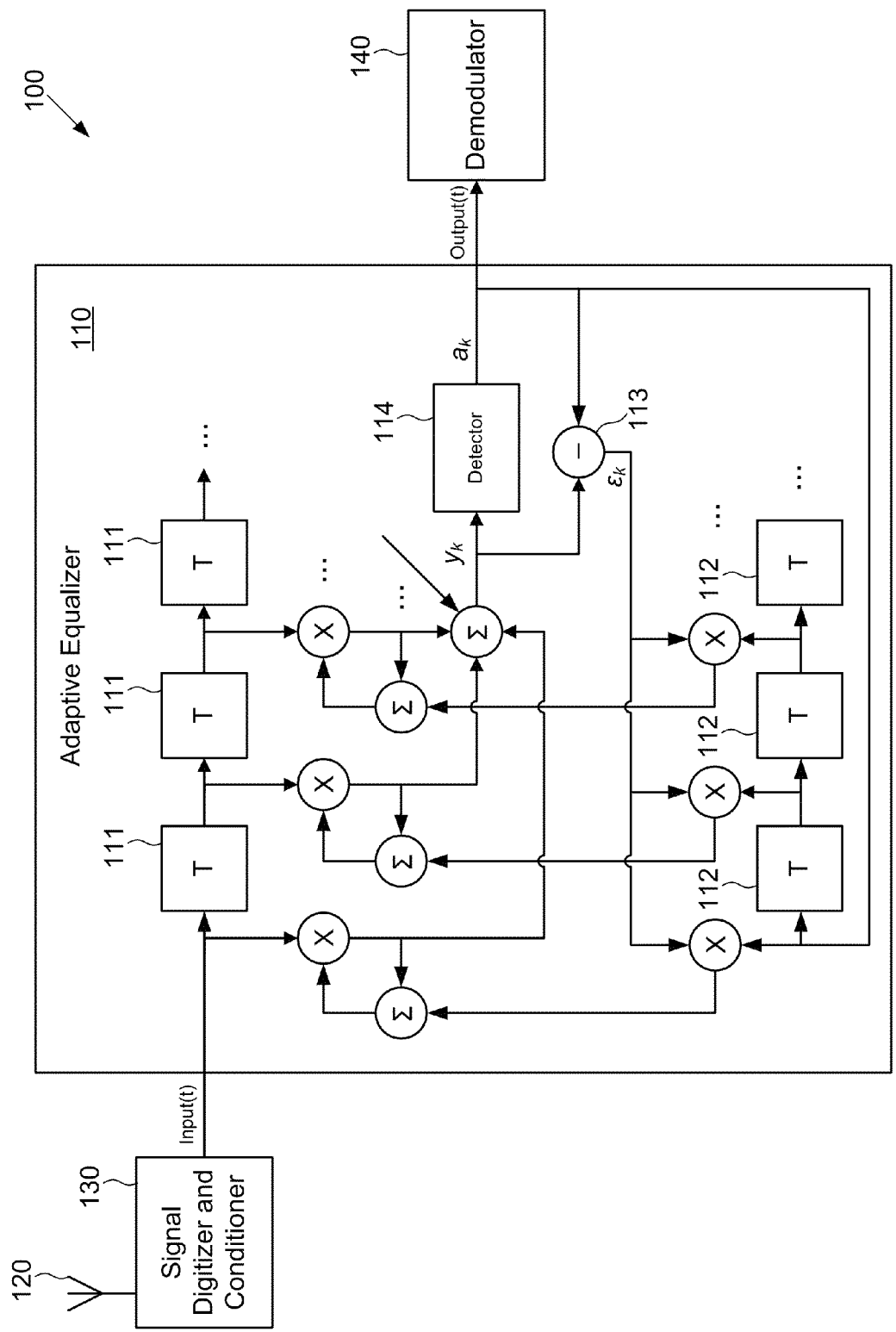
FIG. 1 schematically illustrates components of a previously known adaptive equalizer for use with a receiver for a multipath channel.

Embodiments of the present invention provide dynamic equalization systems and methods for use with a receiver for a multipath channel. The present dynamic equalization systems and methods preferably are based on dynamically measuring spectral characteristics of the channel parameters of a main signal and multipath signal components, and determining equalization parameters based on these spectral characteristics. More specifically, the present systems and methods sequentially obtain digitized signal segments of the main signal and multipath signal components, determine the equalization parameters for each given signal segment based on the frequency characteristics of the channel parameters of that signal segment, and then apply the equalization parameters to that signal segment in real-time, thus dynamically equalizing each signal segment in real-time. More specifically, the channel parameters of the signal and multipath signal components may include the delays, phases, or carrier frequencies, or any suitable combination thereof. The present dynamic equalization systems and methods may analyze and lock to the channel parameters of each given signal segment, and may generate a time-domain representation of each of the analyzed parameters for that signal segment. The present dynamic equalization systems and methods then may Fourier transform the time-domain representation so as to obtain a frequency-domain representation of each given signal segment, and may determine equalization parameters for that signal segment based on the frequency-domain representation of the signal segment.

Preferably, the equalization parameters for a given signal segment are selected so as to provide a filter that corrects the multipath signal components in that signal segment, that may be applied using an equalizer. Additionally, the present dynamic equalization systems and methods may identify the main signal within a signal segment based on the frequency-domain representation of that signal segment, e.g., may identify the earliest-in-time or lowest-frequency spectral components as corresponding to the main signal, and based thereon may provide the frequency-domain representation of the main signal within that signal segment to a demodulator.

It should be appreciated that the present dynamic equalization systems and methods may provide multiple benefits over previously known techniques. For example, as described above, adaptive equalizer receivers may utilize a fixed number of tap delays that may not necessarily correspond to the delays of multipath signal components, particularly when the multipath signal varies over time because of relative movement of the transmitting or receiving antennas or multipath sources. In contrast, the present systems and methods may spectrally analyze a delay lock loop so as to expressly determine—and equalize—the time delays of multipath signal components, rather than attempting to approximate the actual delay values from fixed tap delay spacings, as is done in adaptive equalizer receivers. Additionally, adaptive equalizer receivers may utilize circuitry and algorithms that adaptively adjust to changes in the multipath signal components, and thus may have a limited ability to compensate for rapid changes in those components. In contrast, the present systems and methods dynamically may equalize multipath signal components in real-time, on a per-signal segment basis, thus correcting for those components significantly more quickly and accurately than may an adaptive equalizer receiver.

First, an illustrative embodiment of a dynamic equalization system for use with a receiver for a multipath channel will be described. Then, an illustrative embodiment of a dynamic equalization method for use with a receiver for a multipath channel will be described. Then, exemplary implementations of the present systems and methods will be provided, as illustrative of using the present systems and methods for use with a variety of different types of receivers. Lastly, an example will be described in which a dynamic equalization system was computationally modeled and used to equalize simulated multipath signal components.

Dynamic Equalization System

Figure 2:
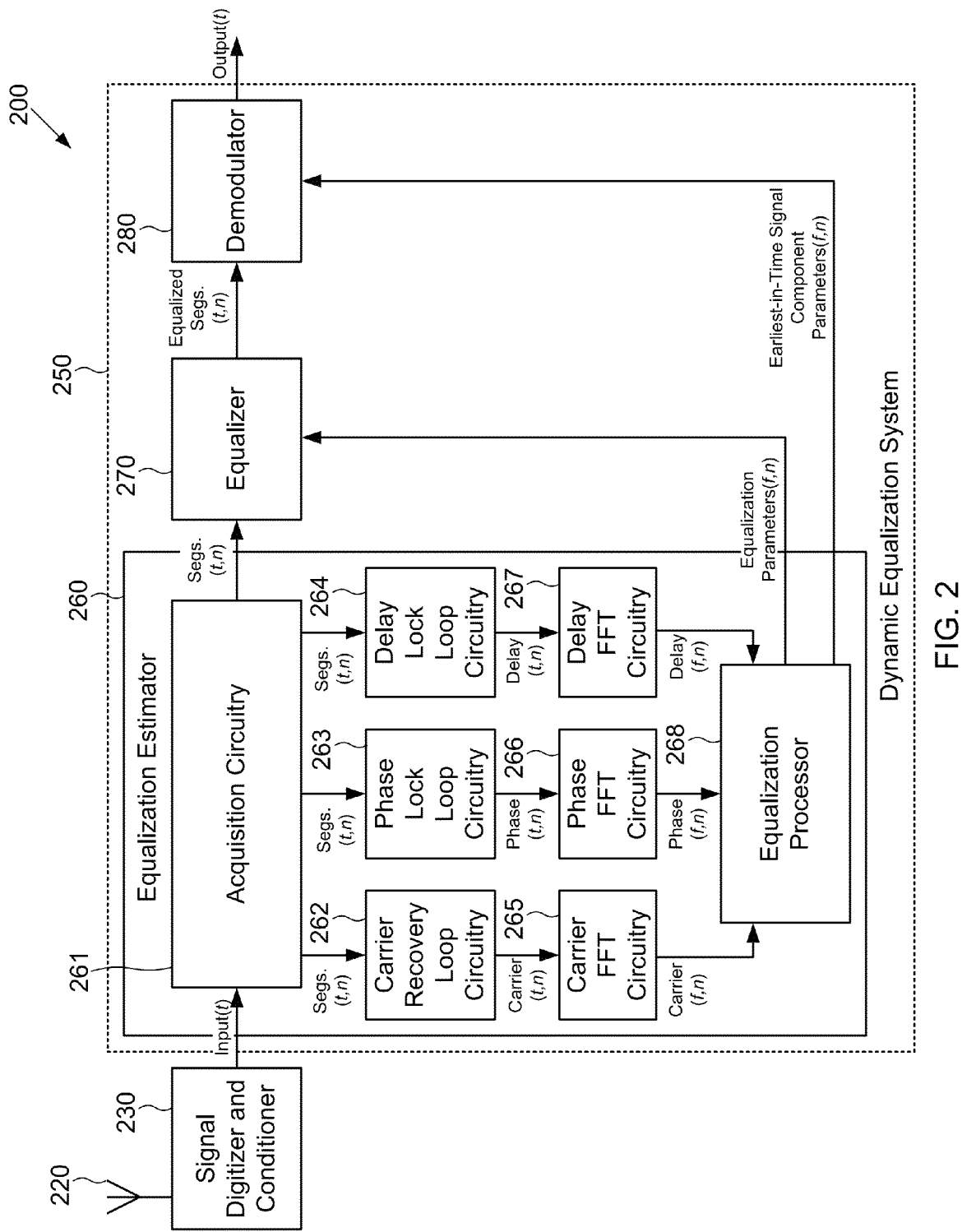
FIG. 2 schematically illustrates components of an exemplary receiver for a multipath channel that includes a dynamic equalization system, according to some embodiments of the present invention.

FIG. 2 schematically illustrates a receiver 200 that includes dynamic equalization system 250, antenna 220, and signal digitizer and conditioner 230, according to some embodiments of the present invention. Receive antenna 220 is configured to receive a signal having multipath signal components, e.g., from a transmitting antenna (not shown) via a multipath channel. Signal digitizer and conditioner 230 obtains and digitizes the signal and multipath signal components received by the antenna, and also may filter or otherwise condition the signal and multipath signal components. The digitized signal, which varies as a function of time, then is provided as input "Input(t)" to dynamic equalization system 250.

Dynamic equalization system 250 includes equalization estimator 260, equalizer 270, and demodulator 280. It should be appreciated that the circuitry illustrated in dynamic equalization system 250 of FIG. 2 may be implemented using commercially available components or may be integrated into one or more discrete electronics modules, field-programmable gate arrays (FPGAs), application-specific integrated circuits (ASICs), or any suitable combination thereof. Additionally, although FIG. 2 illustrates dynamic equalization system 250 as being part of receiver 200, it should be understood that system 250 alternatively may be considered as a stand-alone component that suitably may be used with any receiver for a multipath channel. Additionally, it should be understood that demodulator 280 need not necessarily be considered part of dynamic equalization system 250, and that equalization estimator 260 or equalizer 270 suitably may be used together or may be used separately from one another or from demodulator 280.

In the illustrated embodiment, equalization estimator 260 includes acquisition circuitry 261, carrier recovery loop circuitry 262, phase lock loop circuitry 263, delay lock loop circuitry 264, FFT circuitry 265, 266, 267, and equalization processor 268. Acquisition circuitry 261 is configured to receive the digitized signal and multipath signal components Input(t) from signal digitizer and conditioner 230, and to sequentially output discrete signal segments of length n of the digitized signal and multipath signal components. For example, in some embodiments, the data within the signal may be formatted into blocks of data referred to in the art as frames, that contain both data and preambles that help the receiver to synchronize with the digital format and frame structure, in which case the discrete signal segment length n may be set to the frame length. However, it should be appreciated that length n may be any suitable value, and that the data within the signal need not necessarily be formatted into frames. Acquisition circuitry 261 is configured to sequentially output the discrete signal segments of the digitized signal and multipath components, which are represented in FIG. 2 as "Signal Segments(t,n)" (abbreviated as "Segs. (t,n)") which notation is intended to indicate that the signal segments are in the time-domain, but that they are broken into discrete signal segments of length n rather than as a continuous function of time t, as is Input(t).

Equalization estimator 260 further includes circuitry that is configured to sequentially receive each signal segment, to analyze and lock to one or more channel parameters of the corresponding signal segment, and to output a time-domain representation of each of the analyzed channel parameters for the corresponding signal segment For example, in the illustrated embodiment, such circuitry may include carrier recovery loop circuitry 262, phase lock loop circuitry 263, and delay lock loop circuitry 264. Carrier recovery loop circuitry 262 is configured to sequentially analyze Signal Segments(t, n) and to lock to one or more carrier frequencies therein. For example, each signal segment may include a time-domain component corresponding to the main signal, and one or more additional time-domain components corresponding to multipath signal components, each of which has a carrier frequency. The carrier frequency of the main signal may be equal to the carrier frequency of the original transmitted signal, or alternatively may be Doppler-shifted relative to the carrier frequency of the original transmitted signal if the transmitting and receiving antennas are moving relative to one another. Carrier recovery loop circuitry 262 may be configured to identify and to lock to the carrier frequency of the main signal. For example, carrier recovery loop circuitry 262 may store a nominal range of frequencies at which the carrier frequency of the main signal may be expected based both on the anticipated range of carrier frequencies for the original transmitted signal, as well as on anticipated Doppler shifts that the signal and its multipath signal components may be expected to encounter during transmission along the multipath channel. Carrier recovery loop circuitry 262 may identify the earliest-in-time signal within the signal segment based on the temporal profile of the signal segment, and may determine whether that signal has a frequency within the stored nominal range of frequencies. If so, then carrier recovery loop circuitry 262 may assume that the earliest-in-time signal corresponds to the main signal, and may lock to the carrier frequency of that signal using known feedback loop techniques. Carrier recovery loop circuitry 262 also may identify one or more of the multipath signal components as having the same carrier frequency as the main signal, or as having a different carrier frequency, depending on relative motion of the transmit and receive antennas, and of any multipath sources along the multipath channel. Preferably, carrier recovery loop circuitry 262 outputs a time-domain representation of the carrier frequency characteristics of Signal Segments(t,n), represented in FIG. 2 as "Carrier(t,n)."

Phase lock loop circuitry 263 is configured to sequentially analyze Signal Segments(t,n) and to lock to one or more phases therein. For example, the phase of the main signal may have a certain value corresponding to the distance between the transmitting and receiving antennas and the refractive index of transmissive media along the multipath channel, while the phases of the multipath signal components may depend on the length and refractive index of their particular paths along the multipath channel. Phase lock loop circuitry 263 may be configured to identify and to lock to the phase of the main signal. For example, phase lock loop circuitry 263 may identify the earliest-in-time signal within the signal segment based on the temporal profile of the signal segment, may assume that the earliest-in-time signal corresponds to the main signal, and may lock to the phase of that signal using known feedback loop techniques. Phase lock loop circuitry 263 also may identify the multipath signal components as having the same phase as the main signal, or as having different phases, depending on the relative transmission path of each signal component along the multipath channel. Preferably, phase lock loop circuitry 263 outputs a time-domain representation of the phase characteristics of Signal Segments(t,n), represented in FIG. 2 as "Phase(t,n)."

Delay lock loop circuitry 264 is configured to sequentially analyze Signal Segments(t,n) and to lock to one or more time delays therein. For example, the main signal may be delayed by a certain amount of time corresponding to the distance between the transmitting and receiving antennas and the refractive index of transmissive media along the multipath channel, while the delays of the multipath signal components may depend on the length and refractive index of their particular paths along the multipath channel. Delay lock loop circuitry 264 may be configured to identify and to lock to the delay of the main signal. For example, delay lock loop circuitry 264 may identify the earliest-in-time signal within the signal segment based on the temporal profile of the signal segment, may assume that the earliest-in-time signal corresponds to the main signal, and may lock to the delay of that signal using known feedback loop techniques. Delay lock loop circuitry 264 also may identify the multipath signal components as having the same delay as the main signal, or as having different delays, depending on the relative transmission path of each signal component along the multipath channel. Preferably, delay lock loop circuitry 264 outputs a time-domain representation of the delay characteristics of Signal Segments(t,n), represented in FIG. 2 as "Delay(t,n)."

Equalization estimator 260 further includes fast Fourier transform (FFT) circuitry configured to sequentially receive and to Fourier transform each time-domain representation output by the channel parameter loop circuitry into a frequency-domain representation for each of the analyzed channel parameters for the corresponding discrete signal segment, and to output the frequency-domain representation. For example, in the embodiment illustrated in FIG. 2, equalization estimator 260 includes carrier FFT circuitry 265, phase FFT circuitry 266, and delay FFT circuitry 267. Carrier FFT circuitry 265 is configured to receive Carrier(t,n) for each discrete signal segment from carrier recovery loop circuitry 262, to Fourier transform Carrier(t,n), and to output a frequency-domain representation of Carrier(t,n), represented in FIG. 2 as "Carrier(f,n)." Phase FFT circuitry 266 is configured to receive Phase(t,n) for each discrete signal segment from phase lock loop circuitry 263, to Fourier transform Phase(t,n), and to output a frequency-domain representation of Phase(t,n), and to output a frequency-domain representation of Phase(t,n), represented in FIG. 2 as "Phase(f,n)." Delay FFT circuitry 267 is configured to receive Delay(t,n) for each discrete signal segment from delay lock loop circuitry 264, to Fourier transform Delay(t,n), and to output a frequency-domain representation of Delay(t,n), represented in FIG. 2 as "Delay(f,n)." Note that the frequency-domain representations that are sequentially output by FFT circuitry 265, 266, 267 respectively represent the spectral characteristics of different channel parameters of each of the discrete signal segments Signal Segments(t,n) of Input(t), e.g., the spectral characteristics of the carrier frequencies, phases, and delays within Input(t) for each discrete signal segment. Within such frequency-domain representations, the channel parameter to which the respective loop circuitry 262, 263, or 264 is locked for a given signal segment—preferably corresponding to the earliest-in-time signal, which in turn preferably corresponding to the main signal within that—may be at DC (direct current) at 0 Hz or otherwise may be readily identifiable within the frequency-domain representations.

Equalization estimator 260 further includes equalization processor 268, which is configured to sequentially receive each frequency-domain representation, and based thereon to determine and output the analyzed channel parameters for an earliest-in-time signal component corresponding to the main signal, and further based thereon to determine and output equalization parameters to equalize the multipath signal components. For example, in the embodiment illustrated in FIG. 2, equalization processor 268 may receive Carrier(f,n) from carrier FFT circuitry 265, may receive Phase(f,n) from phase FFT circuitry 266, and may receive Delay(f,n) from delay FFT circuitry 267. Equalization processor 268 may identify a peak within each of these frequency-domain representations that corresponds to the earliest-in-time signal component, which may be assumed to correspond to the main signal. For example, as noted above, the channel parameter to which the respective loop circuitry 262, 263, or 264 is locked for a given signal segment may be at DC or otherwise may be readily identifiable based on the location of a peak within the respective frequency-domain representation. Accordingly, equalization processor 268 may be configured to identify and to output to demodulator 280 the channel parameters of the earliest-in-time signal component based on their respective locations and intensities in the frequency-domain representations, e.g., based on their location at DC and their intensity, which may be relatively high relative to the multipath signal components. These parameters are represented in FIG. 2 as "Earliest-in-Time Signal Component Parameters(f,n)," indicating that the parameters are in the frequency domain and correspond to a particular one of the Signal Segments(t,n).

Additionally, the frequency-domain representations of the channel parameters may include numerous other spectral features that correspond to multipath signal components. For each frequency-domain representation of a channel parameter, equalization processor 268 may determine and output to equalizer 270 a corresponding equalization parameter, e.g., a frequency-dependent filter, that preferably is selected so as to equalize the multipath signal components for each of the channel parameters, e.g., so as to align the multipath signal components with the earliest-in-time signal component for each of the channel parameters. In FIG. 2, the equalization parameters are represented as "Equalization Parameters(f, n)," indicating that the parameters may be in the frequency-domain and correspond to a particular one of the Signal Segments(t,n).

In the embodiment illustrated in FIG. 2, equalizer 270 sequentially receives the discrete Signal Segments(t,n) of the digitized signal and multipath signal components from acquisition circuitry 261, and also sequentially receives corresponding Equalization Parameters(f,n) from equalization processor 268. Equalizer 270 preferably is configured to sequentially apply Equalization Parameters(f,n) to the corresponding Signal Segments(t,n) so as to equalize the multipath signal components, e.g., so as to align the multipath signal components with the earliest-in-time signal components for those signal segments, and to output the equalized signal segments. For example, although not specifically illustrated, equalizer 270 may include FFT circuitry configured to Fourier transform Signal Segments(t,n) into spectral bins within the frequency-domain, may include weighting circuitry configured to weight each of the bins based on the Equalization Parameters(f,n), and may include inverse-FFT (iFFT) circuitry configured to inversely Fourier transform the weighted bins into equalized signal segments "Equalized Signal Segments(t,n)," in the-time domain.

Demodulator 280 may be configured to sequentially receive the Equalized Signal Segments (t,n) from equalizer 270 and the corresponding Earliest-in-Time Signal Component Parameters(f,n) from Equalization Processor 268 with the equalized multipath signal components within the Equalized Signal Segments(t,n) based thereon. Accordingly, following such processing, the earliest-in-time signal components, corresponding to the main signal, and the multipath signal components may be both equalized and aligned with one another in time, resulting in constructive interference therebetween that may increase the signal-to-noise ratio within demodulator 280, and may decrease distortion and spectral broadening that otherwise may have been caused by destructive interference between the main signal and the multipath signal components. As such, demodulator 280 may sequentially demodulate the aligned, equalized signal segments so as to obtain an Output(t) corresponding to the signal, but with significantly reduced distortion from the multipath signal components.

Although FIG. 2 illustrates the use of channel parameter loop circuitry that locks to carrier frequency, phase, and delay, it should be understood that equalization estimator 260 may include circuitry configured to lock to any suitable one, two, three, four, five or more channel parameters of Signal Segments(t,n) for use in determining Equalization Parameters(f,n) and Earliest-in-Time Signal Component Parameters(f,n). Additionally, some subset of the channel parameters suitably may be used to determine Equalization Parameters(f,n), while another subset of the channel parameters suitably may be used to determine Earliest-in-Time Signal Component Parameters(f,n). Moreover, such channel parameter loop circuitry may be adapted so as to use a priori known information to facilitate locking to the channel parameter, although the use of such a priori known information is not necessary. For additional detail on the use of a priori known information about channel parameters in distinguishing signals from one another, see U.S. Pat. Nos. 8,199,851 and 8,462,879 to Dybdal et al., the entire contents of both of which are incorporated by reference herein.

Dynamic Equalization Method

An exemplary dynamic equalization method 300 for use with a receiver for a multipath channel now will be described with reference to FIG. 3. Although steps of method 300 may be described with reference to system 200 illustrated in FIG. 2, it should be understood that method 300 suitably may be implemented using any suitable combination of hardware and software.

Method 300 includes sequentially outputting signal segments of length n of a digitized signal and multipath signal components (step 310). For example, acquisition circuitry 261 illustrated in FIG. 2 may receive a digitized, optionally conditioned signal and multipath signal components from signal digitizer and conditioner 230, and may output Signal Segments(t,n) of the digitized signal and multipath signal components to loop circuitry 262, 263, and 264 and to equalizer 270 in a manner such as further described elsewhere herein.

Figure 3:
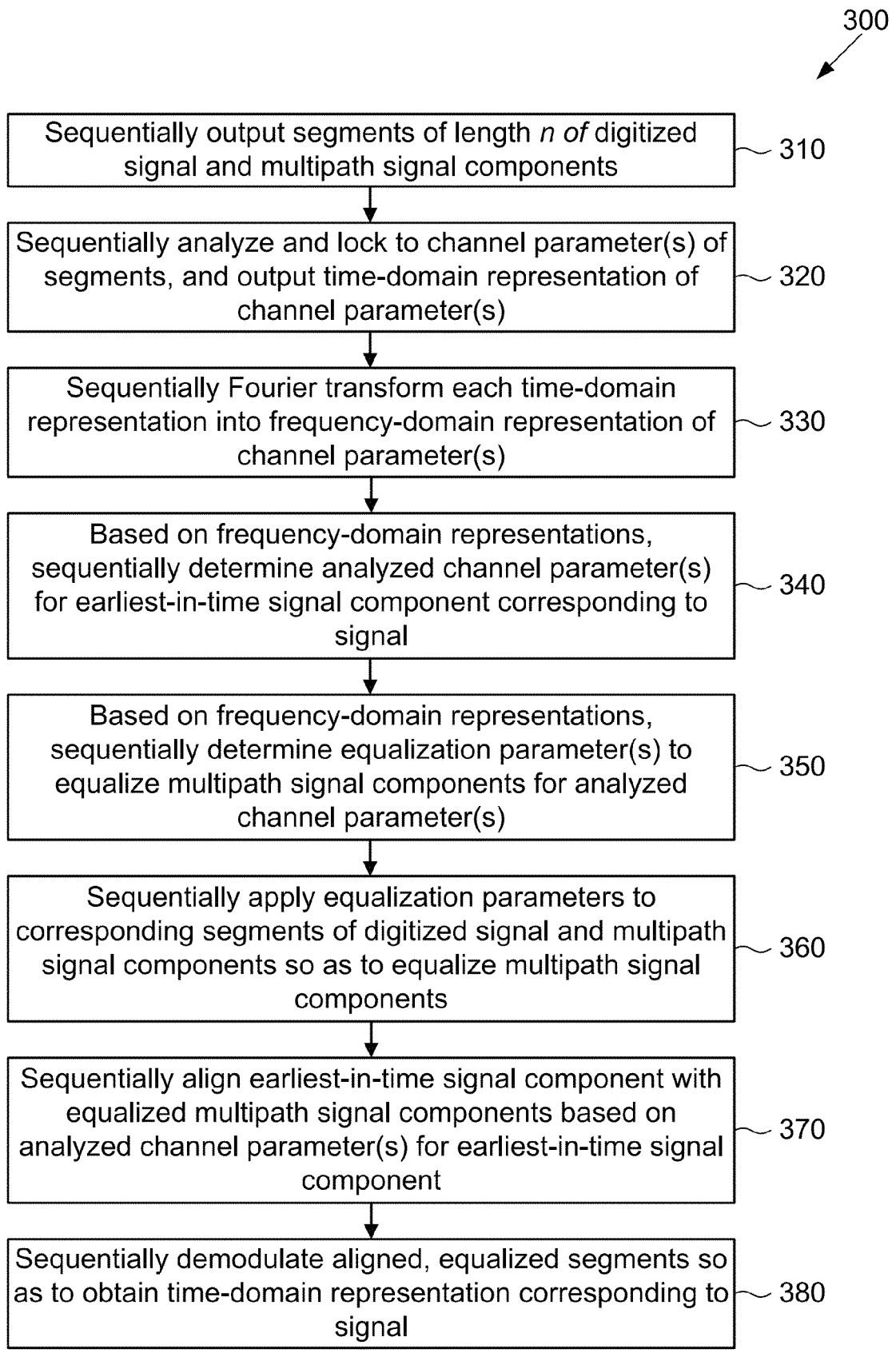
FIG. 3 illustrates steps in an exemplary method for using an exemplary dynamic equalization system with a receiver for a multipath channel, according to some embodiments of the present invention.

Method 300 illustrated in FIG. 3 further includes sequentially analyzing and locking to one or more channel parameters of the signal segments, and outputting a time-domain representation of the channel parameters (step 320). For example, carrier recovery loop circuitry 262, phase lock loop circuitry 263, and delay lock loop circuitry 264 illustrated in FIG. 2 may lock to their respective channel parameters, and respectively may output Carrier(t,n), Phase(t,n), and Delay(t,n) to corresponding FFT circuitry 265, 266, 267 in a manner such as further described elsewhere herein.

Method 300 illustrated in FIG. 3 further includes sequentially Fourier transforming each time-domain representation of the channel parameters into a frequency-domain representation of the channel parameters (step 330). For example, in the embodiment illustrated in FIG. 2, carrier FFT circuitry 265 may Fourier transform Carrier(t,n) into Carrier(f,n); phase FFT circuitry 266 may Fourier transform Phase(t,n) into Phase(f,n); and delay FFT circuitry 267 may Fourier transform Delay(t,n) into Delay(f,n) in a manner such as further described elsewhere herein.

Method 300 illustrated in FIG. 3 further includes, based on the frequency-domain representations, sequentially determining the analyzed channel parameters for an earliest-in-time signal component, which preferably corresponds to the main signal (step 340). For example, as described in greater detail above with reference to FIG. 2, the frequency-domain representations may include peaks corresponding to the channel parameters for the earliest-in-time signal component, e.g., peaks at DC. Equalization processor 268 may determine these channel parameters based on the location and intensity of the peaks within the frequency-domain representations, e.g., in a manner such as further described elsewhere herein.

Method 300 illustrated in FIG. 3 further includes, based on the frequency-domain representations, sequentially determining equalization parameters to equalize the multipath signal components for the analyzed channel parameters (step 350). For example, equalization processor 268 illustrated in FIG. 2 may determine frequency filters or other equalization parameters that may equalize the multipath signal components, e.g., align the multipath signal components with the earliest-in-time signal component, in a manner such as further described elsewhere herein.

As illustrated in FIG. 3, method 300 further includes sequentially applying the equalization parameters to corresponding signal segments of the digitized signal and multipath signal components, so as to equalize the multipath signal components (step 360). For example, equalizer 270 illustrated in FIG. 2 may receive Signal Segments(t,n) from acquisition circuitry 261, may receive Equalization Parameters(f,n) from equalization processor 268, and may apply Equalization Parameters(f,n) to Signal Segments(t,n) in a manner such as further described elsewhere herein.

Method 300 illustrated in FIG. 3 further includes sequentially aligning the earliest-in-time signal component with the equalized multipath signal components based on the analyzed channel parameters for the earliest-in-time signal component (step 370). For example, as illustrated in FIG. 2, demodulator 280 may receive Equalized Signal Segments(t,n) from equalizer 270, may receive Earliest-in-Time Signal Component Parameters(f,n) from equalization processor 268, and may align the earliest-in-time signal component with the equalized multipath signal components within Equalized Signal Segments(t,n).

Additionally, method 300 illustrated in FIG. 3 may include sequentially demodulating the aligned, equalized signal segments so as to obtain a time-domain representation according to the signal (step 380). For example, demodulator 280 may demodulate the aligned, equalized signal segments so as to generate Output(t) for further use. Methods of demodulating signals are known in the art.

Exemplary Implementations of Systems and Methods

So as to illustrate the use of the present dynamic equalization systems and methods in different arrangements and with different types of receivers, two exemplary implementations now will be provided, the first of which relates to global positioning system (GPS) receivers, and the second of which relates to reducing the effects of cross-talk between orthogonally polarized signals, such as may be caused by the presence of rain or other scattering media along the multipath channel. However, it should be understood that such implementations are intended to be merely illustrative, and not limiting of the invention.

Figure 4A:
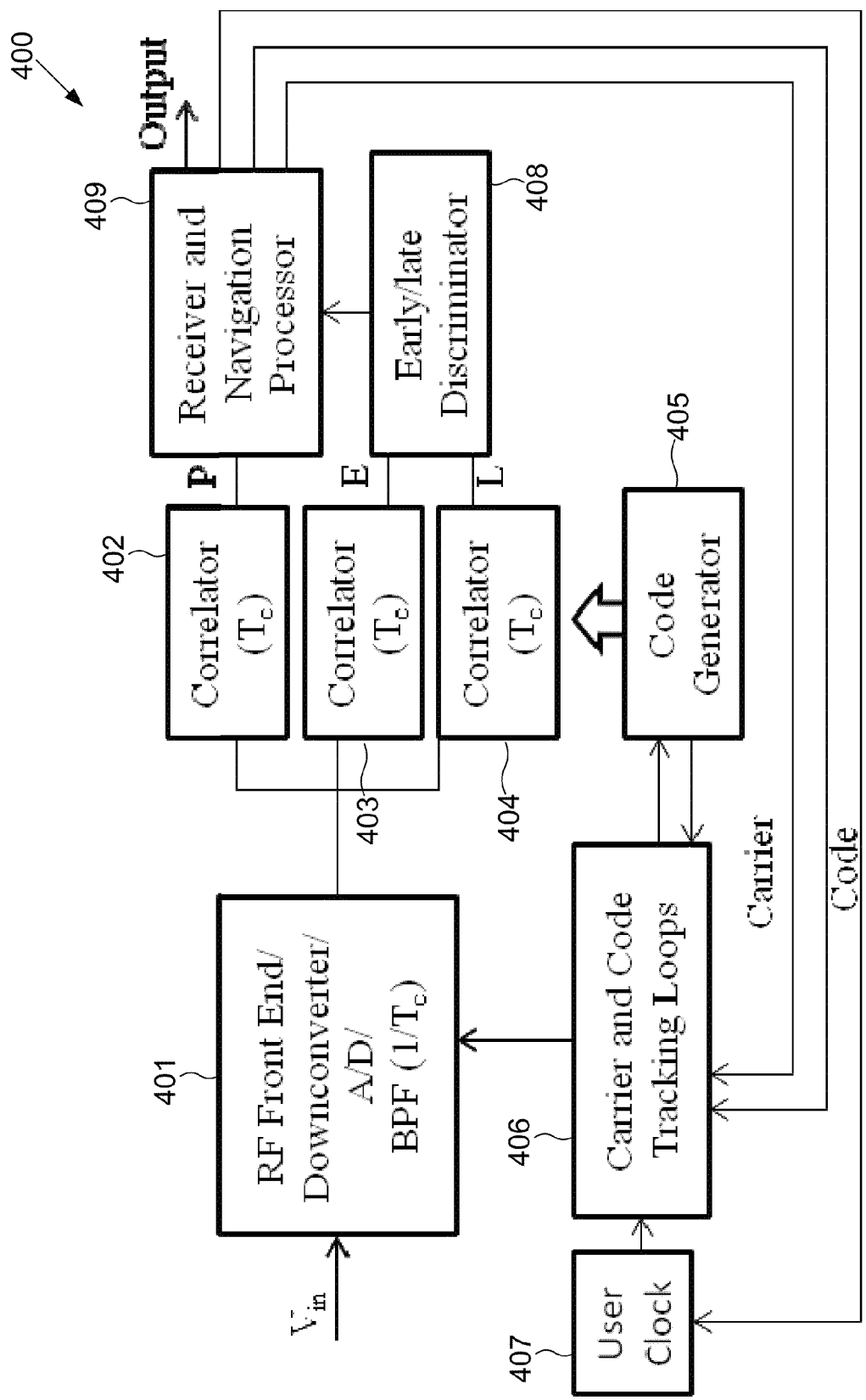
FIG. 4A schematically illustrates components of a previously known global positioning system (GPS) receiver.

FIG. 4A schematically illustrates components of a previously known GPS receiver 400 for use in sequentially processing signals from multiple GPS satellites, so as to substantially uniquely determine the systems' position in all three spatial dimensions and in time. Alternatively, as is known in the art, GPS systems may include multiple of such receivers for use in processing signals from multiple GPS satellites. GPS receiver 400 includes radio frequency (RF) unit 401, correlators 402, 403, 404, code generator 405, carrier and code tracking loops 406, user clock 407, early/late discriminator 408, and receiver and navigation processor 409.

RF unit 401 illustrated in FIG. 4A receives input signal Vin from an antenna, and includes circuitry for pre-processing and conditioning the input signal. More specifically, RF unit 401 may include a front-end bandpass filter (BPF) configured to bandlimit the signal, a downconverter that may be configured to operate in multiple stages so as to downconvert the bandlimited signal, an analog-to-digital (A/D) converter configured to convert the downcoverted signal into the digital domain, and another, digital BPF to match the code within the signal, e.g., at 2 MHz for coarse acquisition (CA) code or at 20 MHz for precise (P) code. The digitized code component then is provided to correlators 402, 403, 404, as is a replica of the code produced by code generator 405, and the range delay i of the received code component relative to that generated by code generator 405 is determined. More specifically, as is known in the art, a separate low data rate signal superimposed on the navigational coded signals within the signal from the GPS satellite contains information about the satellite's position and the time on the satellite's clock relative to the master system clock. GPS receiver 400 is configured to acquire the code in two dimensions, specifically the carrier frequency phase that is offset by Doppler, and the code delay that tracking that is accomplished by carrier and code tracking loops 406. The code tracking loop 406 aligns the received code component's time delay with the replica code component generated by code generator 405. The time delay difference i between the received code component and the replica code, multiplied by the speed of light c, provides the distance between the GPS satellite and receiver 400. This time alignment is implemented by carrier and code tracking loops 406 and uses the cross correlation of the received signal's code component and the code replica from code generator 405. Correlator 402 provides the direct path signal, referred to as "prompt" (P), to receiver and navigation processor 409. Correlators 403 and 404 offset the replica codes provided by code generator 405 in time, one being "early" (E) relative to the P response, and the other being "late" (L) relative to the P response, and respectively provide the E and L responses to early/late discriminator 408. Early/late discriminator 408 subtracts the early and late responses from the code so as to improve the resolution of the time delay $\tau$ indicated by the P response.

The above process may be sequentially repeated using the same receiver to process the received coded navigational signals from different satellites, or concurrently to simultaneously process signals from at least two other satellites in parallel using additional receiving electronics, and the knowledge of those satellites' positions (which is transmitted in the low data rate signal) and the range delay $\tau$, is used to determine the location of receiver 400 relative to those satellites. Similar information from a fourth satellite also may be used using the same receiver or a different receiver to establish the difference in the time indicated by user clock 407 and the satellite's clock.

However, if terrestrial multipath sources generate multipath signal components of the main signal from the GPS satellite to receiver 400, the accuracy of the navigational solution may be degraded. First, the multipath signal components may introduce a carrier frequency phase spectrum that degrades the performance of carrier tracking loop 406. Typically, this spectrum is referred to as "loop stress." Based on the measured loop stress, the bandwidth of the phase tracking loop is increased, which degrades the resolution of the range delay $\tau$. Additionally, the presence of time delayed multipath components may distort the correlation by correlators 402, 403, 404 between the received main signal and the replica generated at code generator 405, thus introducing further inaccuracies into the value of the range delay $\tau$. Thus, providing equalization within receiver 400 may allow the receiver's carrier frequency tracking loop 406 to operate on the direct signal component, rather than the spectral response that results with multipath and to reduce the distortion of the correlation responses so as to approach an accuracy similar to that without the presence of multipath signal components.

Figure 4B:
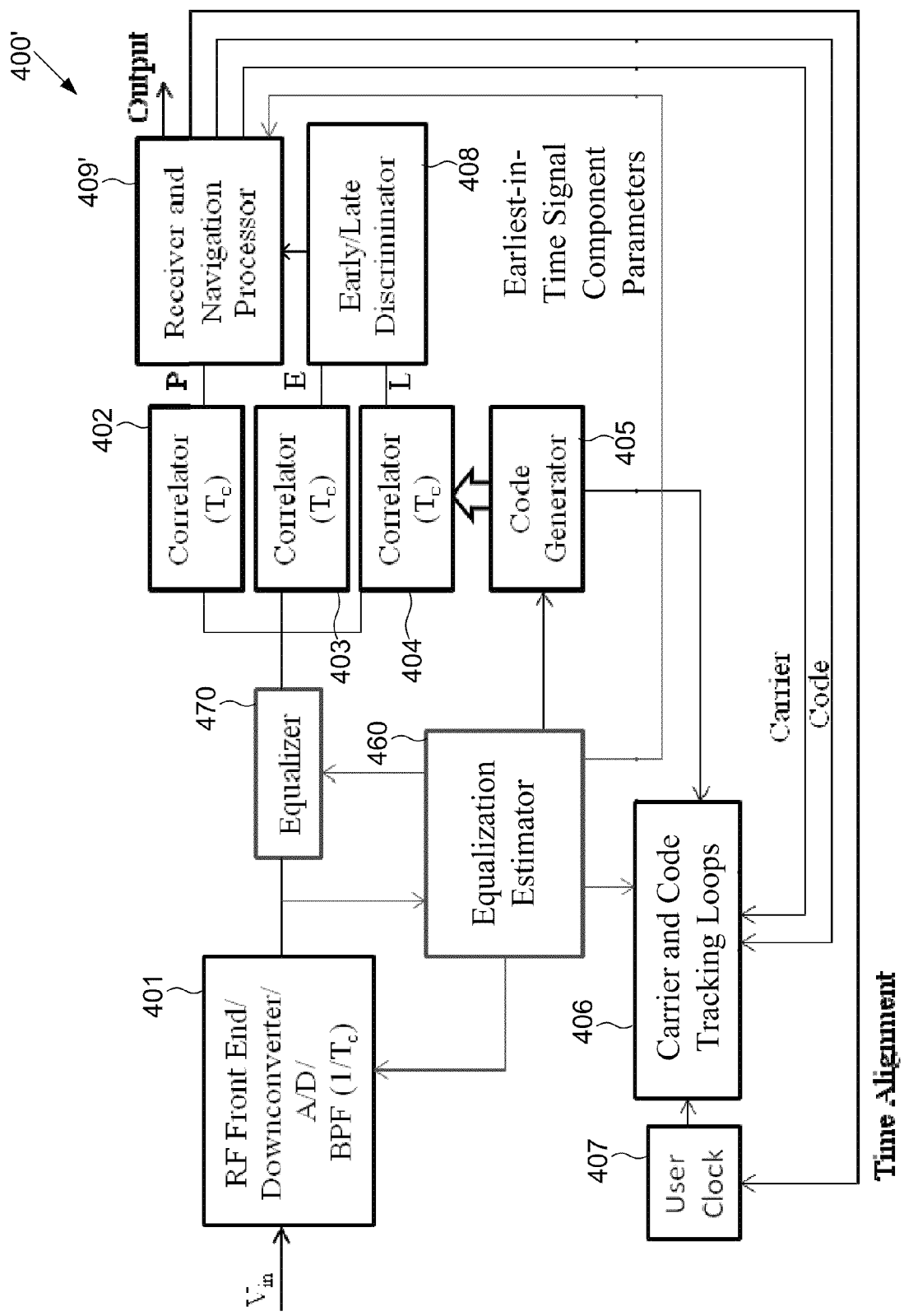
FIG. 4B schematically illustrates components of an exemplary global positioning system (GPS) receiver that includes a dynamic equalization system, according to one illustrative embodiment of the present invention.

FIG. 4B schematically illustrates components of an exemplary GPS receiver 400' that is similar to receiver 400 illustrated in FIG. 4A, but that also includes components that provide dynamic equalization. More specifically, GPS receiver 400' includes equalization estimator 460 that is configured analogously to equalization estimator 260 described above with reference to FIG. 2, equalizer 470 that is configured analogously to equalizer 270 described above with reference to FIG. 2, and a modified receiver and navigation processor 409' that is configured similarly to processor 409 described above with reference to FIG. 4A, but that further is configured so as to receive and process earliest-in-time signal channel parameters determined by equalization estimator 460 in a manner analogous to that described above for demodulator 280 with reference to FIG. 2A. GPS receiver 400' also includes radio frequency (RF) unit 401, correlators 402, 403, 404, code generator 405, carrier and code tracking loops 406, user clock 407, and early/late discriminator 408 which may be analogous to those described above with reference to FIG. 4A.

In operation, RF unit 401 may process e.g., may receive, digitize, and filter, the received input signal Vin, which may include both the main signal and multipath signal components. The resulting data stream then is provided to equalization estimator 460, which may distinguish the "earliest-in-time" signal component, corresponding to the main signal, from the multipath signal components in a manner analogous to that described above with reference to FIG. 2. Equalization estimator 460 then may provide the earliest-in-time signal component parameters to the carrier and code phase tracking loops 406 for use in locking to the code within the main signal component; note that these tracking loops suitably may be modified so as to accept and utilize the earliest-in-time signal component parameters. Equalization estimator 460 also may provide the earliest-in-time signal component parameters to modified receiver and navigation processor 409' for use in determining range time τ based on the outputs of correlators 402, 403, 404. Additionally, equalization estimator 460 may determine and may provide equalization parameters to equalizer 470 for use in equalizing multipath signal components within the data stream that equalizer 470 receives from RF unit 401. Equalizer 470 then may provide the equalized data stream to correlators 402, 403, 404 for use in more accurately determining the P, E, and L code components provided to early/late discriminator 408 and receiver and navigation processor 409'.

Note that during operation, the use of equalization estimator 460 and equalizer 470 may introduce a relatively small time delay into the circuitry of GPS receiver 400'. Although such a time delay may not be significant for many applications, it may be desirable to correct such a time delay for GPS applications in which the navigational solution depends on the time delay. The time delay introduced by equalization estimator 460 and equalizer 470 may be calculated based on the weighting of the frequency bins, and this delay provided to receiver and navigation processor 409' to correct the measured range delay τ.

Figure 4C:
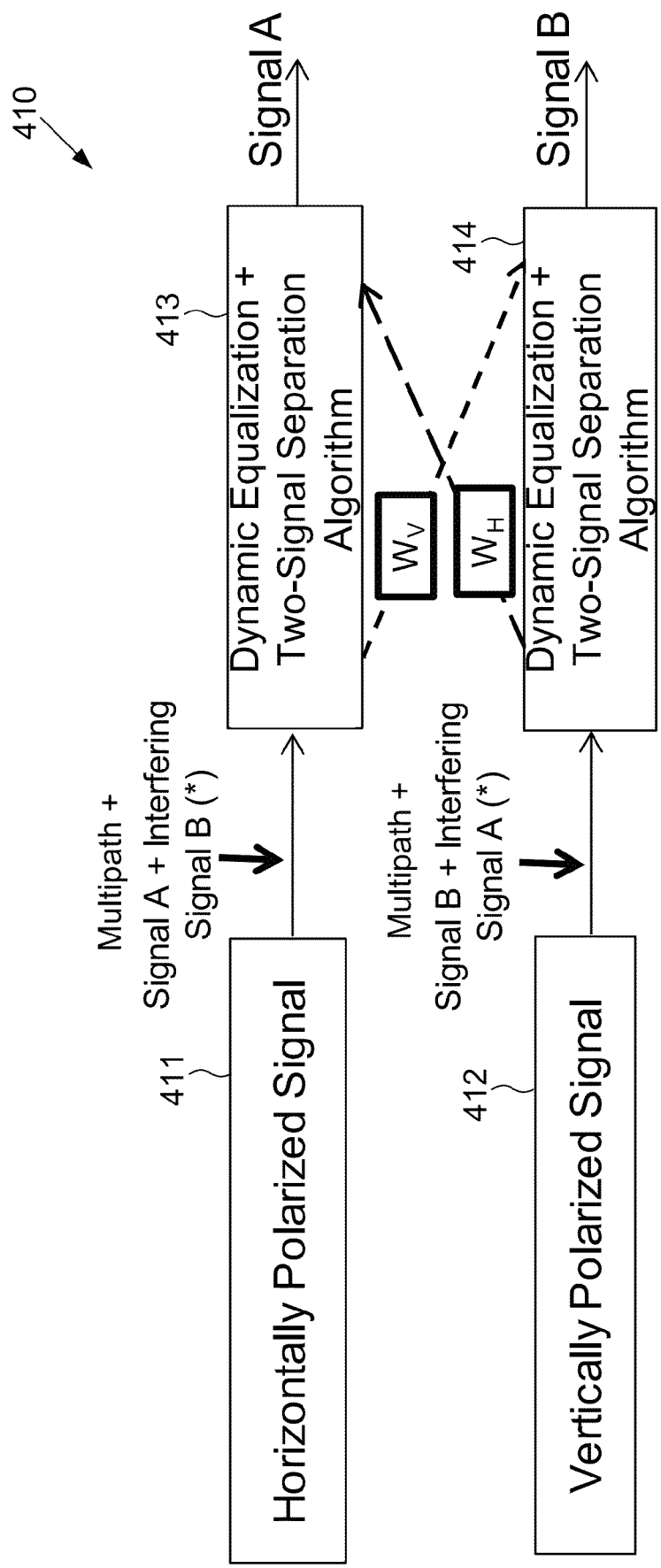
FIG. 4C schematically illustrates a high level overview of the use of a pair of dynamic equalization systems in separating cross-polarized signals from one another, according to one illustrative embodiment of the present invention.

FIG. 4C illustrates another illustrative implementation of the present dynamic equalization systems and methods for use in mitigating multipath signal components that may arise in communication channels that include raindrops or other scattering media. More specifically, 4C schematically illustrates a high level overview 410 of the use of a pair of dynamic equalization systems in reducing the effects of multipath signal components within orthogonal signals that have become cross-polarized with one another due to the presence of raindrops or other scattering media along a multipath channel, before separating those signals from one another using known techniques, e.g., such as described in greater detail in U.S. Pat. Nos. 8,199,851 and 8,462,879 to Dybdal et al., the entire contents of both of which are incorporated by reference herein.

As illustrated in FIG. 4C, horizontally polarized signal "A" 411 and vertically polarized signal "B" 412 may be transmitted along a communication channel that includes both multipath sources and scattering media, such as raindrops, that cause cross-polarization. Accordingly, at the receive side, the received horizontally polarized signal includes main signal A as well as cross-polarized contributions from signal B, as well as multipath signal contributions from both signal A and the cross-polarized contributions from signal B; and the received vertically polarized signal includes main signal B as well as cross-polarized contributions from signal A, as well as multipath signal contributions from both signal B and the cross-polarized contributions from signal A. At 413 and 414, the received signals first may be dynamically equalized using the systems and methods provided herein, and subsequently may be respectively provided to a two-signal separation algorithm such as disclosed in U.S. Pat. Nos. 8,199,851 and 8,462,879 to Dybdal et al. for separation with improved accuracy.

EXAMPLE

In the following example, which is intended to be purely illustrative and not limiting of the invention, a dynamic equalization system and method were computationally modeled using MATLAB (The MathWorks, Inc., Natick, Mass.) so as to demonstrate the effects of equalizing multipath signal components along a simulated multipath channel.

Figure 5:
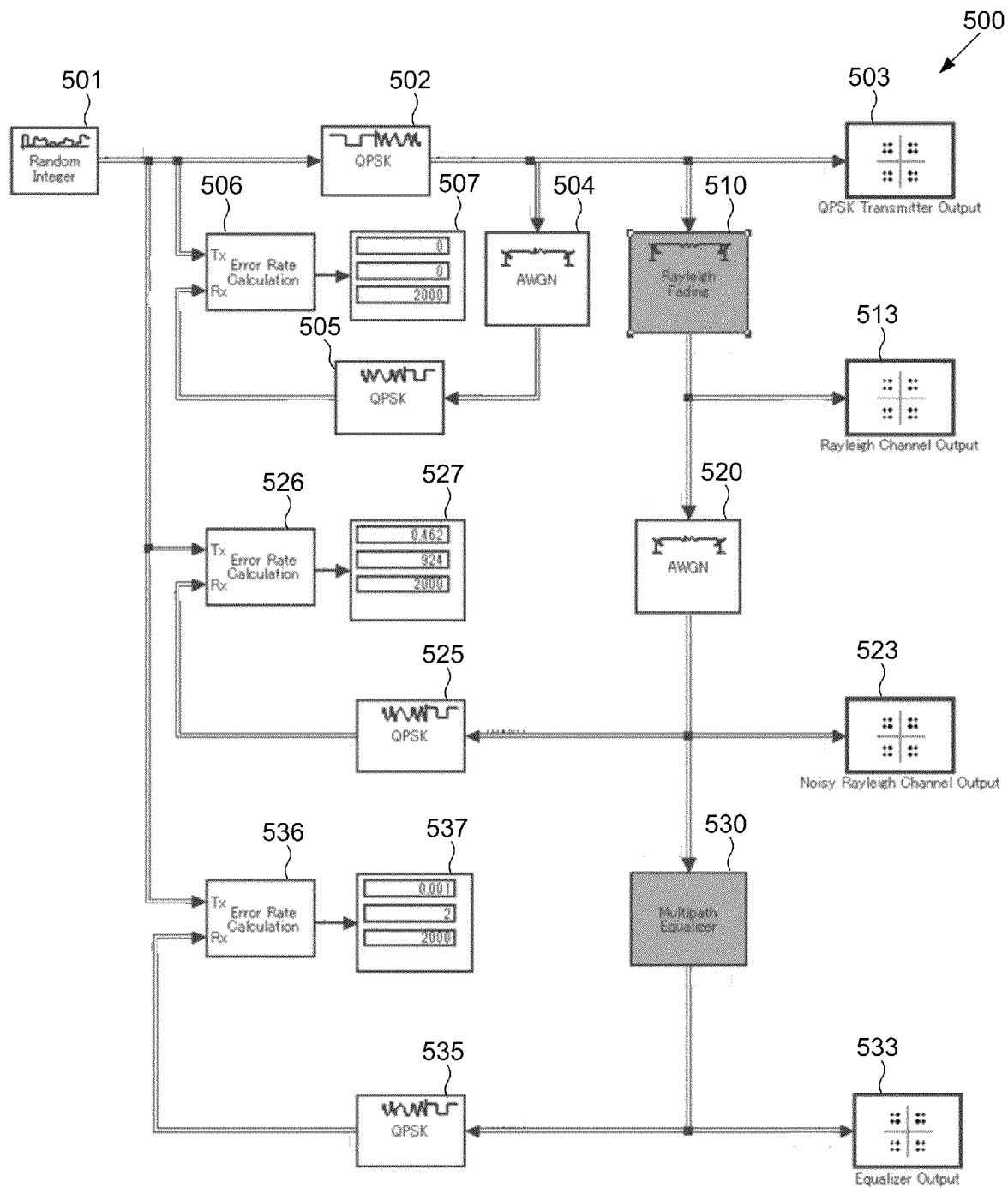
FIG. 5 schematically illustrates a process flow used to computationally model a dynamic equalization system and method for use with a receiver for a simulated multipath channel that includes additive white Gaussian noise (AWGN) and Rayleigh fading, according to some embodiments of the present invention.
Figure 7:
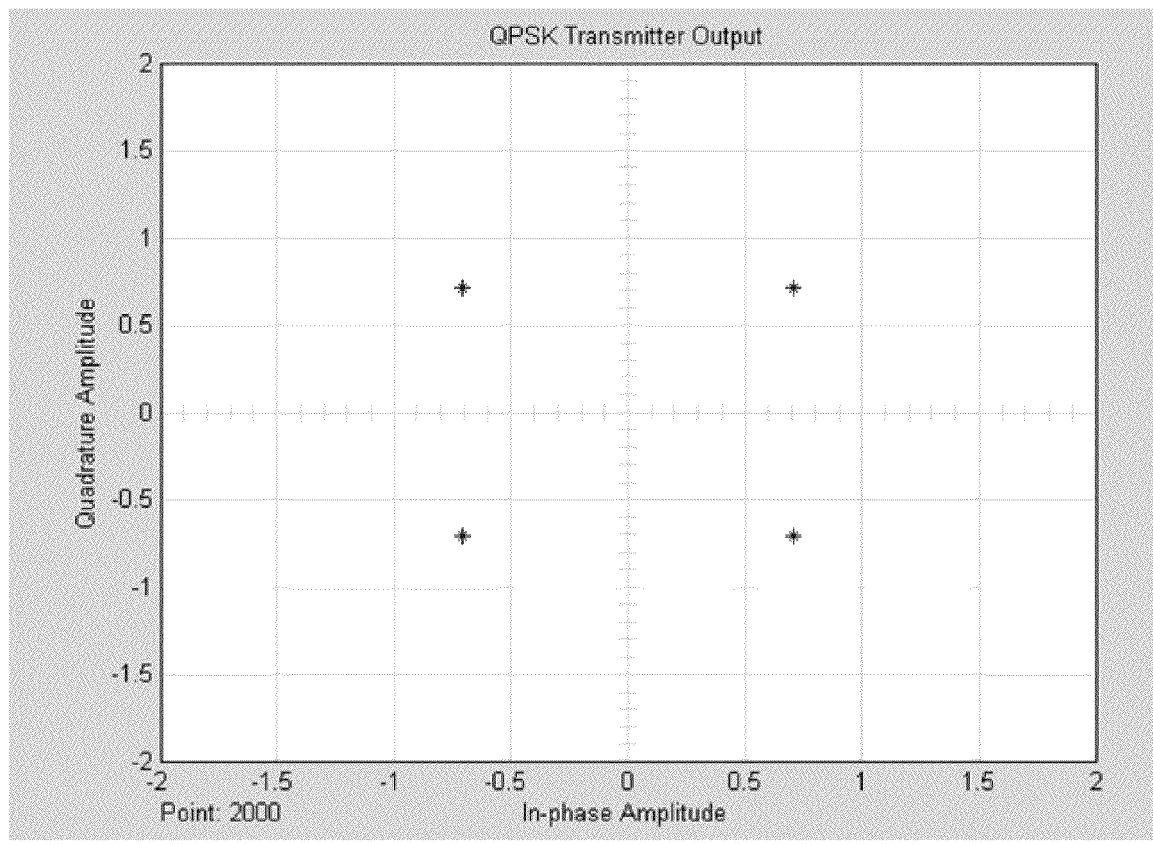
FIG. 7 is a plot of a simulated quadrature phase-shift keying (QPSK)-modulated signal generated during the process flow of FIG. 5, as a function of in-phase amplitude and quadrature amplitude.

FIG. 5 schematically illustrates the process flow 500 used in such a model. Specifically, a main signal made up of random integers first was generated (501), and then was modulated with a quadrature phase-shift keying (QPSK) carrier signal (502). This main signal was purposely devoid of error correction coding so that the equalization benefits would not be obscured by the error correction benefits. The resulting QPSK-modulated signal then was plotted (503). FIG. 7 is a plot of the resulting QPSK-modulated signal as a function of in-phase amplitude and quadrature amplitude at 500 time points, in which the signal value at a given time point is represented with an asterisk "*," as it also is in subsequent plots of QPSK-modulated signals. It may be seen that over the 500 time points, the QPSK-modulated signal occurred at any one of only four locations in phase/quadrature space, as would be expected because QPSK is based on encoding bits as a function of four phases.

Additive White Gaussian noise (AWGN) was added to the QPSK-modulated signal (504). As is known to those skilled in the art, both terrestrial and satellite-based communication channels have background noise that may be modeled using AWGN, which is white noise with a constant spectral density and a Gaussian amplitude distribution. For this example, the specific amount of noise added resulted in a signal to noise ratio (SNR) of 8 dB. The resulting signal was demodulated (505), and the bit error rate (BER) of the demodulated signal was calculated (507) by comparing the demodulated signal to the original main signal (506). The top value provides the bit-error-rate (BER), which is the ratio of the total number of bits in error to the total number of bits measured (shown as the middle and bottom values respectively. It was found that over 2000 bits, the bit error rate (BER) was zero. Accordingly, adding sufficient AWGN to produce a 8 dB SNR did not affect the BER of the demodulated signal.

As illustrated in FIG. 5, in a different process sub-flow, simulated Rayleigh fading was added to the QPSK-modulated signal (510) so as to simulate the effects of multipath sources and relative movement of the transmit and receive antennas and the multipath sources. More specifically, two multipath signal components were simulated at respective time delays of 3 microseconds and 5 microseconds after the main signal, and having amplitudes respectively at 12 dB and 20 dB below that of the main signal, and simulated Rayleigh fading was applied to the three components. The Doppler shift of the Rayleigh fading was set to 500 Hz for all three components with Jakestype Doppler spectrum). AWGN was added to the Rayleigh faded signal (520) resulting in an SNR of 8 dB. The resulting QPSK-modulated signal then was plotted (523).

Figure 8A:
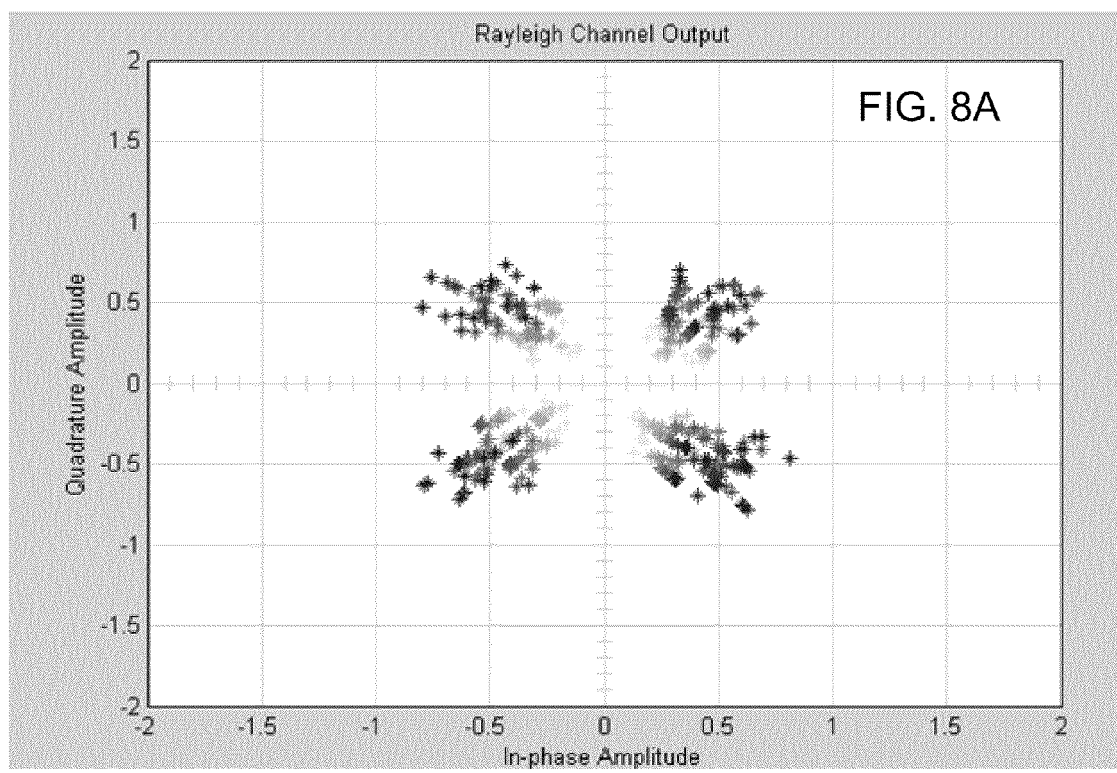
FIGS. 8A-8C are plots of the in-phase and quadrature amplitudes of the QPSK-modulated signal of FIG. 7, for multiple time points, following transmission through a simulated multipath channel having Rayleigh fading during the process flow of FIG. 5.
Figure 8B:
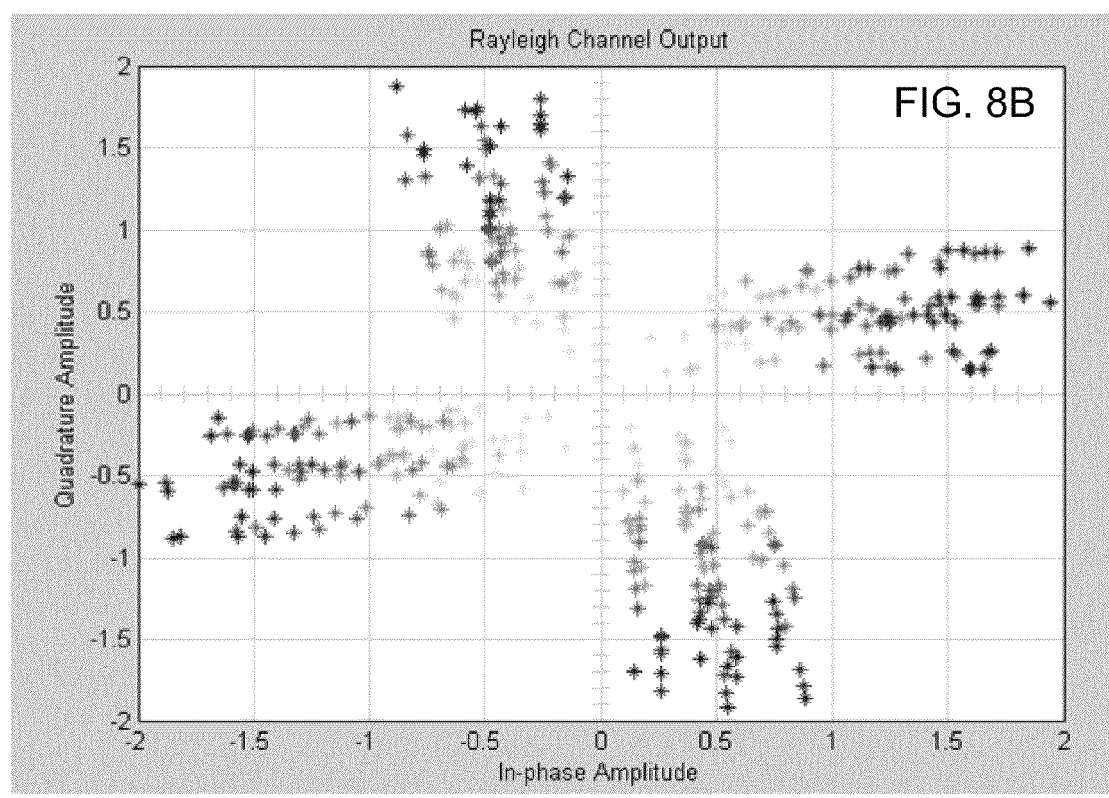
Figure 8C:
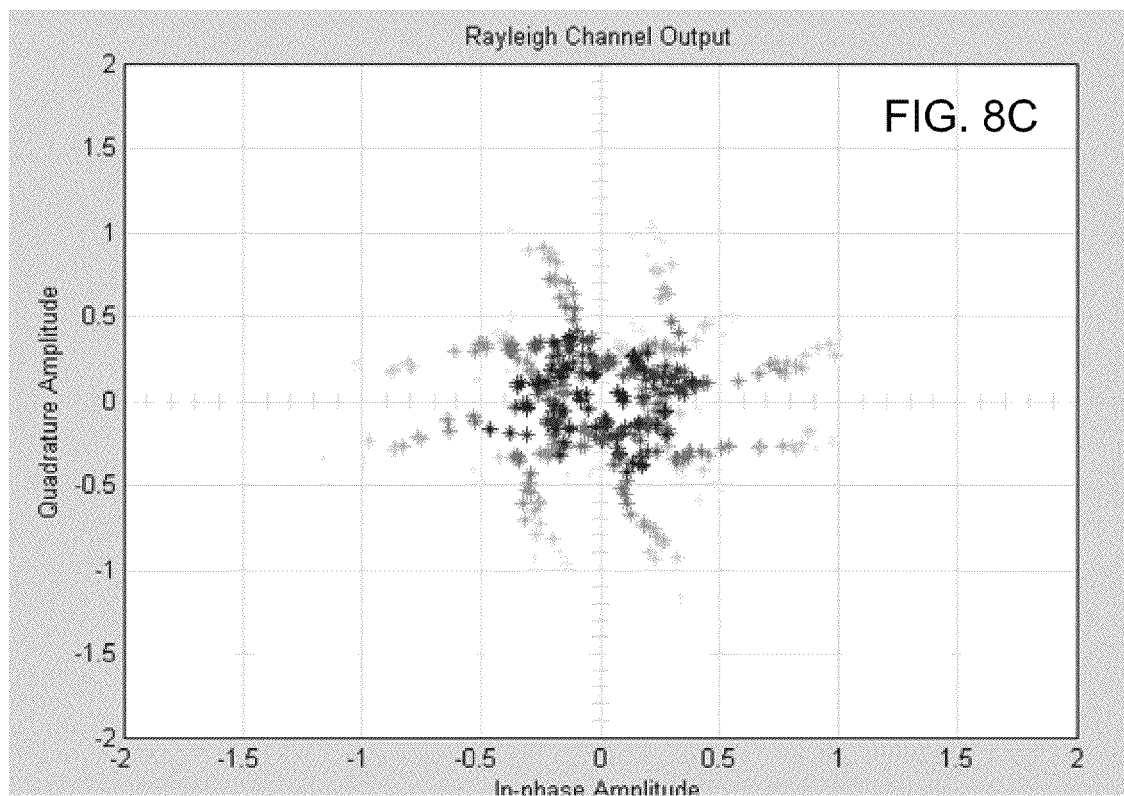

FIG. 8A is a plot of the resulting QPSK-modulated signal with Rayleigh fading as a function of in-phase amplitude and quadrature amplitude at 500 time points, in which the signal values of more recent time points are shown with darker asterisks, and the signal values of older time points are shown with lighter asterisks. It may be seen that instead of appearing at only four fixed locations, as was the case for FIG. 7, the positions in phase/quadrature space of the modulated signal in FIG. 8A moved over time because of the Rayleigh fading, which caused the frequencies, phases, and delays of the three signal components (one main signal and two multipath components) to shift relative to each other. Indeed, FIG. 8B is a plot of the same QPSK-modulated signal with Rayleigh fading at another 500 time points, and FIG. 8C is a plot of the same QPSK-modulated signal with Rayleigh fading at yet another 500 time points. It may be seen that the positions in phase/quadrature space of the signal fluctuated significantly over time because of the Rayleigh fading. However, because the signal tended to remain in the same quadrant over time, it was believed that the signal still may be demodulated with a BER that was acceptable for at least some applications.

Figure 9A:
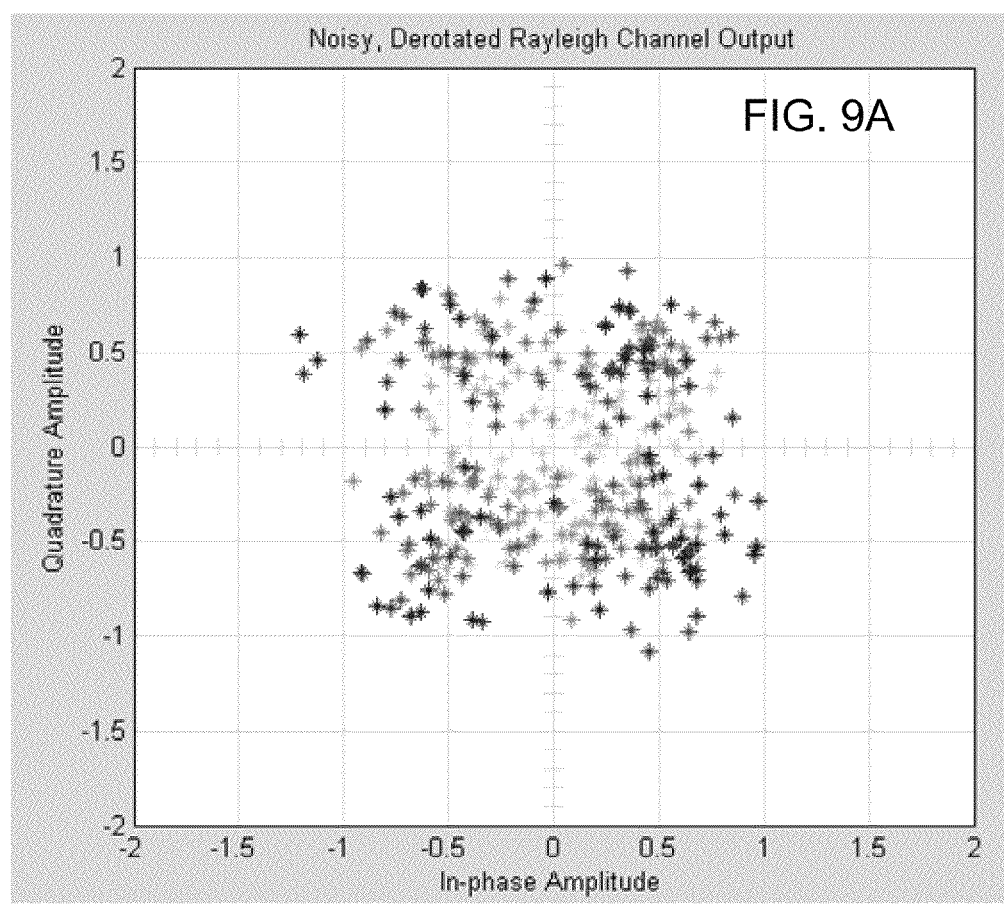

However, so as to more accurately simulate a real-world multipath channel, additive white Gaussian noise (AWGN) was added to the QPSK-modulated signal with Rayleigh fading (520), and the resulting signal plotted (523). FIGS. 9A-9C plots of the resulting signal at time points corresponding to the same time points as in FIGS. 8A-8C, respectively. It may be seen that, with the combination of the AWGN with the Rayleigh fading, the QPSK-modulated signal varied still more significantly than with Rayleigh fading only, and that the signal no longer remained in the same quadrant over time.

So as to illustrate the types of signal fluctuations that may occur as a result of the combination of AWGN and Rayleigh fading—which may simulate the types of signal fluctuations that occur along a real-world multipath channel—FIGS. 10A-10C are time-domain plots of the QPSK-modulated signal with AWGN and Rayleigh fading at three different time signal segments that respectively occurred during FIGS. 9A-9C. FIGS. 11A-11C respectively are frequency-domain plots of the signal segments in FIGS. 10A-10C. In FIG. 10A, it may be seen that the main signal 1001 at 0 microseconds has a magnitude of about 0.80 and is broadened, that the first multipath signal component 1002 at a delay of 3 microseconds has a magnitude of about 0.15 and is broadened, and that the second multipath component 1003 at a delay of 5 microseconds also has a magnitude of about 0.15 and is broadened. Additionally, it may be seen that the magnitudes of the first and second multipath signal components 1002, 1003 are similar to that of the noise within the signal segment. In the corresponding frequency-domain plot of FIG. 11A, it may be seen that the frequency spectrum of the signal segment has magnitudes that fluctuate between about 0 dB and −6 dB, with a minimum at about 40 kHz, which is relatively close to the center frequency of the main signal, at 0 Hz.

In the different time signal segment shown in FIG. 10B, it may be seen that the main signal 1001' at 0 microseconds has a magnitude of about 1.7 and is broadened, that the first multipath signal component 1002' at a delay of 3 microseconds has a magnitude of about 0.25 and is broadened, and that the second multipath component 1003' at a delay of 5 microseconds has a magnitude of about 0.20 and is broadened. Additionally, it may be seen that the magnitudes of the first and second multipath signal components 1002', 1003' again are similar to that of the noise within the signal segment. In the corresponding frequency-domain plot of FIG. 11B, it may be seen that the frequency spectrum of the signal segment has magnitudes that fluctuate between about 7 dB and 2.5 dB, with a minimum at about 60 kHz, which is relatively close to the center frequency of the main signal, at 0 Hz.

In the different time signal segment shown in FIG. 10C, it may be seen that the main signal 1001" at 0 microseconds has a magnitude of about 0.21 and is broadened, that the first multipath signal component 1002" at a delay of 3 microseconds has a magnitude of about 0.22 and is broadened, and that the second multipath component 1003" at a delay of 5 microseconds has a magnitude of about 0.08 and is broadened. Additionally, it may be seen that the magnitude of the main signal 1001" is slightly less than that of the first multipath signal component 1002", and that the magnitude of the second multipath signal component 1003" is similar to that of the noise within the signal segment. In the corresponding frequency-domain plot of FIG. 11C, it may be seen that the frequency spectrum of the signal segment has magnitudes that fluctuate between about −6 dB and −33 dB, with strong minima at about −410 kHz, −90 kHz, and 220 kHz.

FIG. 12A is a plot of the relative amplitudes of the main signal 1001''' and first and second multipath signal components 1002''', 1003''' as a function of time over 100 time points for the QPSK-modulated signal with AWGN and Rayleigh fading. It may be seen that both the relative and absolute amplitudes of each of the signal contributions vary over time, and indeed that the amplitude of first multipath signal component 1002''' is at some times lower than that of second multipath signal component 1003''', and at other times higher than that of the second multipath signal component. FIG. 12B is a time-domain plot of signal segment of the composite signal at a time of approximately 63.7 milliseconds, in which it may be seen that the main signal 1001''' at 0 microseconds has a magnitude of about 1.14 and is broadened, first multipath signal component 1002''' at a delay of 3 microseconds has a magnitude of about 0.20 and is broadened, and that the second multipath component 1003''' at a delay of 5 microseconds has a magnitude of about 0.18 and is broadened. Additionally, it may be seen that the magnitudes of the first and second multipath signal components 1002''', 1003''' are similar to that of the noise within the signal segment. FIG. 12C is a plot of the real and imaginary phase components of main signal 1001''' and first and second multipath signal components 1002''', 1003''' for the time period illustrated in FIG. 12A. It was observed that the relative and absolute phase components of main signal 1001''' and first and second multipath signal components 1002''', 1003''' fluctuated significantly over time.

Accordingly, from FIGS. 10A-10C, 11A-11C, and 12A-12C it may be seen that the amplitudes, magnitudes and phases of the main signal and the multipath signal components may fluctuate significantly over time, which may cause significant changes in the frequency spectrum of the signal and may lead to difficulties in demodulating the signal. Indeed, referring again to FIG. 5, so as to quantitatively assess the effect of the combination of AWGN and Rayleigh fading on BER of the signal, the QPSK-modulated signal with AWGN and Rayleigh fading was demodulated (525), and the bit error rate (BER) of the demodulated signal was calculated (527) by comparing the demodulated signal to the original main signal (526). It was found that over 2000 bits, the number of bits in error was 924, which was significantly higher than that of the signal having only AWGN along the communication channel. Accordingly, it was believed that the combination of AWGN and Rayleigh fading detrimentally affected the BER of the demodulated signal, and may lead to significant difficulties in obtaining information from the demodulated signal.

Figure 6:
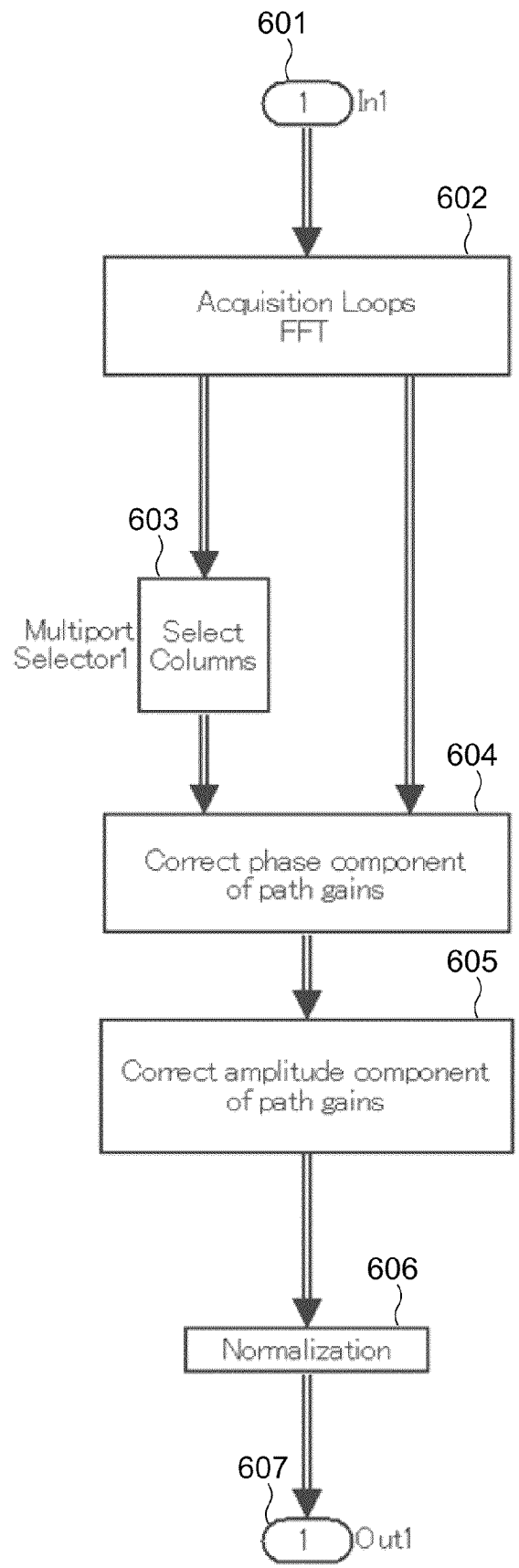
FIG. 6 schematically illustrates a process sub-flow used to computationally model a dynamic equalization system and method for use with a receiver for the simulated multipath channel during the process flow of FIG. 5, according to some embodiments of the present invention.

Referring again to FIG. 5, the QPSK-modulated signal having AWGN and Rayleigh fading then were dynamically equalized (530) using a simulated system and method analogous to those described above with reference to FIGS. 2 and 3. FIG. 6 illustrates the process sub-flow that was applied to the simulated signal. The QPSK-modulated signal with AWGN and Rayleigh fading was provided as input (601), to which acquisition loops and FFT were applied (602). More specifically, signal segments of the composite signal were sequentially analyzed using acquisition loops so as to lock to the phase and delay channel parameters of each signal segment, and time-domain representations of these channel parameters of each signal segment were generated, in a manner analogous to step 320 of method 300 described above with reference to FIG. 3. Note that for the delay channel parameter, such time-domain representations may contain analogous information to that illustrated in FIGS. 10A-10C and 12B, which respectively are locked to the delay of main signal 1001, 1001', 1001", 1001''' for different signal segments and thus set the delay channel parameter of the main signal to a time of 0 microseconds. For the phase channel parameter, such time-domain representations may contain analogous information to that illustrated in FIG. 12C, which is locked to the phase of main signal 1001''' for the illustrated signal segment. The time-domain representations then were Fourier transformed using an FFT algorithm into frequency-domain representations of the respective channel parameters. Note that for the delay channel parameter, such frequency-domain representations may contain analogous information to that illustrated in FIGS. 11A-11C, which respectively are locked to the delay of main signal 1001, 1001', 1001'' for different signal segments and thus set the frequency of the delay channel parameter of the main signal to a frequency of 0 Hz. The output of the acquisition loops and FFT (602) was in the form of two columns respectively corresponding to the delay channel parameter and the phase channel parameter in the frequency domain.

Referring again to FIG. 6, the columns for each of the signal segments then were respectively analyzed so as determine the phase and delay channel parameters for the earliest-in-time signal 1001, as well as to select equalization parameters to equalize the multipath signal components 1002, 1003 for the delay and phase channel parameters (603), corresponding to steps 340 and 350 of method 300 described above with reference to FIG. 3. More specifically, the channel parameters for the earliest-in-time signal 1001 were determined based on the value of the parameters at 0 Hz, corresponding to the main signal. The equalization parameters were selected based on the features of the frequency-domain representations, e.g., based on the spectra in FIGS. 11A-11C for three selected signal segments, by selecting a filter that equalized the multipath signal contributions when applied to the frequency-domain representation of the corresponding phase or delay channel parameter. The filter for the phase channel parameter then was applied to the signal segment (604), the filter for the delay channel parameter then was applied to the signal segment (605), and the signal segment was then normalized (606) and output (607).

Figure 13A:
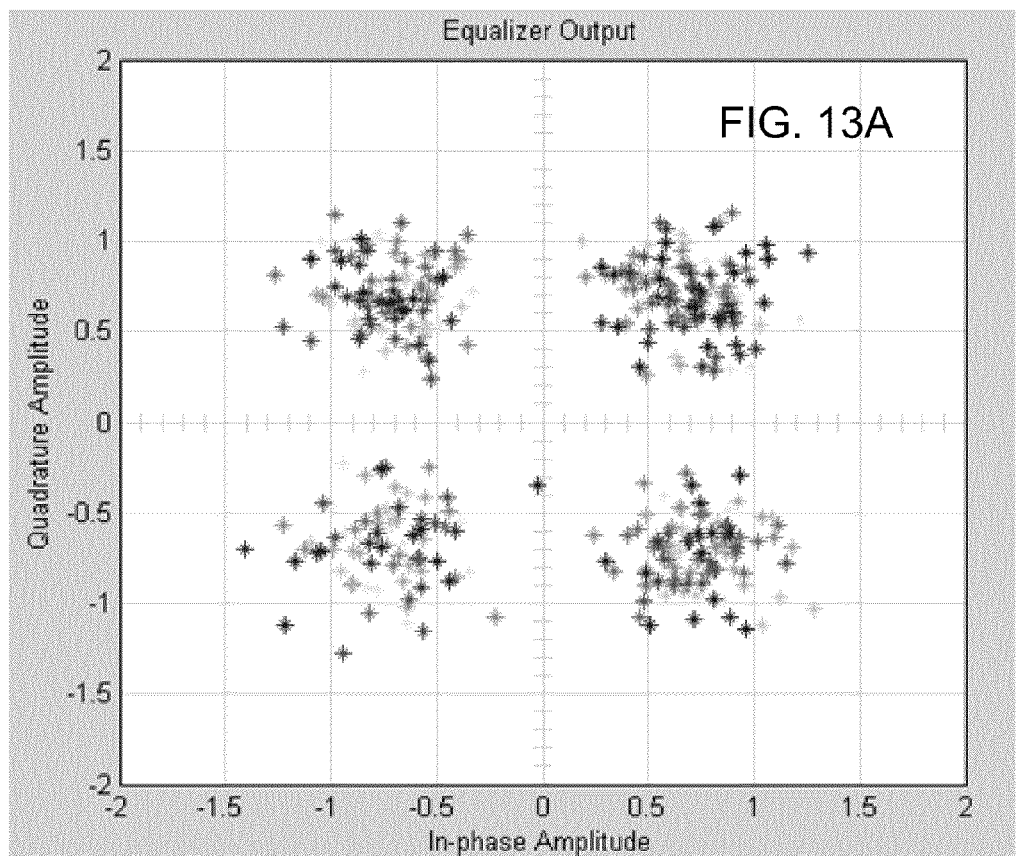
Figure 13B:
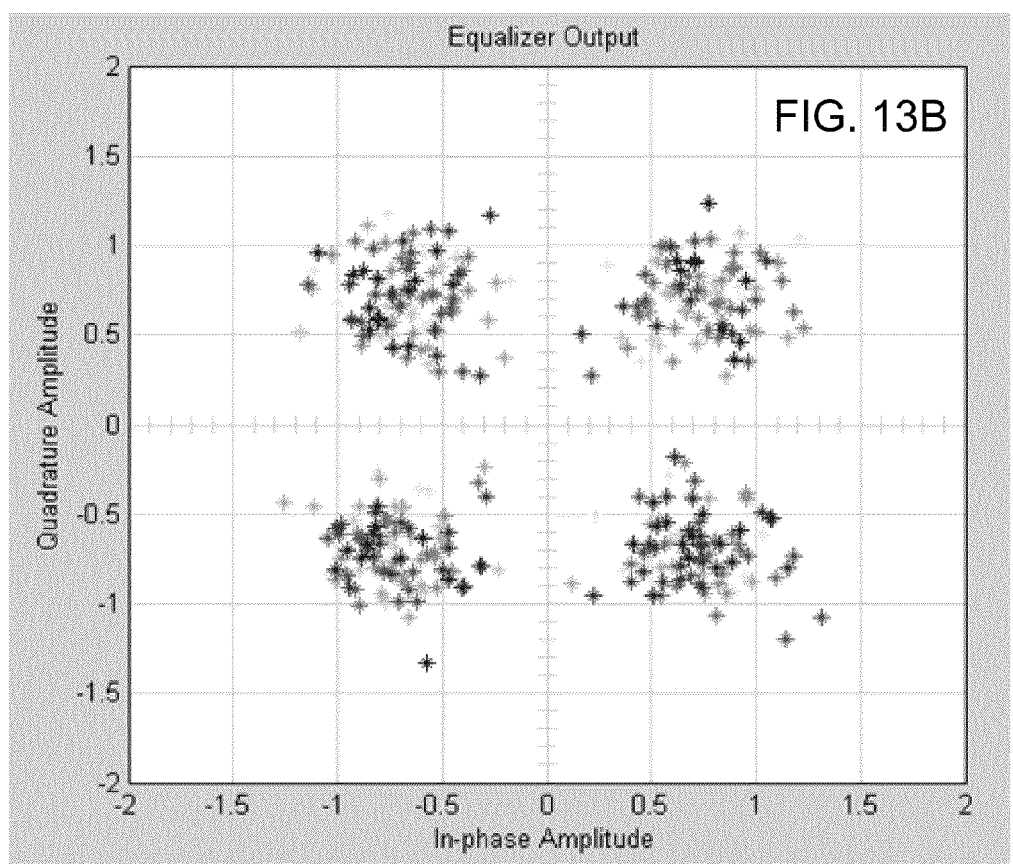

Referring back to FIG. 5, the dynamically equalized QPSK-modulated signal with AWGN and Rayleigh fading then was plotted (533). FIGS. 13A-13C plots of the resulting signal at time points corresponding to the same time points as in FIGS. 9A-9C, respectively. It may be seen that the dynamic equalization significantly improved the signals' regular occurrence within a given quadrant relative to the same QPSK-modulated signal with AWGN and Rayleigh fading before equalization (FIGS. 9A-9C) and with less movement than the same QPSK-modulated signal with only Rayleigh fading (FIGS. 8A-8C), although with greater scatter than in the QPSK-modulated signal without AWGN or Rayleigh fading (FIG. 6).

Referring again to FIG. 5, so as to quantitatively assess the effect of dynamically equalizing the QPSK-modulated signal with AWGN and Rayleigh fading, the dynamically equalized signal was demodulated (535), and the bit error rate (BER) of the demodulated signal was calculated (537) by comparing the demodulated signal to the original main signal (536). It was found that over 2000 bits, the number of bits in error was 2, which was significantly lower than that of the signal having both AWGN and Rayleigh fading, and only slightly higher than that of the signal only AWGN along the communication channel. Accordingly, it was believed that the present dynamic equalization systems and methods successfully may be used to demodulate, with low BER, signals having both AWGN and Rayleigh fading, as well as signals along real-world, noisy multipath channels.

Alternative Embodiments

While preferred embodiments of the invention are described herein, it will be apparent to one skilled in the art that various changes and modifications may be made. For example, it should be understood that the present dynamic equalization systems and methods may be used with signals having any suitable modulation formats. Like other equalization approaches, the present dynamic equalizer can be applied to many applications. For example, the multipath equalization for GPS receivers is a consequence of the multipath susceptibility of broad coverage antennas needed to receive signals from multiple satellites; a similar multipath susceptibility results from the broad coverage antennas used in terrestrial wireless applications. The cross polarization equalization may be required by propagation path distortions. In adaptive interference cancellation systems using sidelobe cancellers, equalization may be required in the auxiliary antennas to match the frequency dependence of the sidelobe response of the main antenna so that effective adaptive interference cancellation is achieved over the required bandwidth. Equalizers also may be applied to signal transmitting applications to compensate distortions in the transmitted waveforms. These applications and others address compensation of imperfections caused by signal distortion. The appended claims are intended to cover all such changes and modifications that fall within the true spirit and scope of the invention.

What is claimed:

1. A dynamic equalization system for use with a receiver, the receiver comprising an antenna configured to receive a signal distorted by multipath signal components and a digitizer configured to obtain and digitize the signal and multipath signal components received by the antenna, the dynamic equalization system comprising:
    an equalization estimator configured to receive the digitized signal and multipath signal components from the digitizer, the equalization estimator comprising:
        acquisition circuitry configured to sequentially output discrete signal segments of length n of the digitized signal and multipath signal components;
        channel parameter loop circuitry configured to sequentially analyze and lock to channel parameters including phase, delay, and carrier frequency of the corresponding signal segment, and to output a time-domain representation of each of the analyzed channel parameters for the corresponding signal segment;
        Fourier transform circuitry configured to sequentially Fourier transform each time-domain representation into a frequency-domain representation for each of the analyzed channel parameters for the corresponding discrete signal segment, and to output the frequency-domain representation; and
        an equalization processor configured to determine and output equalization parameters to equalize the multipath signal components for each of the analyzed channel parameters based on the frequency-domain representations;
    an equalizer configured to sequentially receive the discrete signal segments of the digitized signal and multipath signal components from the acquisition circuitry, to sequentially receive the equalization parameters from the equalization processor, to sequentially apply the equalization parameters to the corresponding signal segments so as to equalize the multipath signal components, and to output the equalized signal segments; and alignment circuitry configured to sequentially receive the corresponding equalized signal segments from the equalizer and the analyzed channel parameters for an earliest-in-time signal component from the equalization processor and to align the earliest-in-time signal component with the equalized multipath signal components within the equalized signal segments based thereon.

2. The dynamic equalization system of claim 1, wherein the equalization processor further is configured to sequentially determine and output the analyzed channel parameters for the earliest-in-time signal component corresponding to the signal based on the frequency-domain representations.

3. The dynamic equalization system of claim 2, wherein the equalization processor is configured to determine the analyzed channel parameters for the earliest-in-time signal for a signal segment based on a position or amplitude of those parameters in the frequency-domain representation for that signal segment.

4. The dynamic equalization system of claim 1, further comprising demodulation circuitry configured to sequentially demodulate the aligned, equalized signal segments so as to obtain a time-domain representation corresponding to the signal.

5. The dynamic equalization system of claim 1, wherein the equalization processor is configured to determine the equalization parameters for each of the analyzed channel parameters of a signal segment by calculating a filter that equalizes the multipath signal components for each of the analyzed channel parameters in that signal segment.

6. The dynamic equalization system of claim 5, wherein the equalizer is configured to apply the filter to the signal segment.

7. The dynamic equalization system of claim 1, wherein the channel parameter loop circuitry is configured to analyze and lock to the channel parameters based on a priori known information about the signal.

8. The dynamic equalization system of claim 1, wherein the signal comprises a sequence of blocks each having a preamble and data, and wherein n is equal to the length of each of the blocks.

9. A dynamic equalization method for use with a receiver comprising an antenna configured to receive a signal having multipath signal components and a digitizer configured to obtain and digitize the signal and multipath signal components received by the antenna, the method comprising:
    receiving the digitized signal segment and multipath signal components from the digitizer, and sequentially outputting discrete signal segments of length n of the digitized signal and multipath signal components;
    sequentially analyzing and locking to channel parameters including phase, delay, and carrier frequency of the discrete signal segments, and outputting a time-domain representation of the analyzed channel parameters for each signal segment;
    sequentially Fourier transforming each of the time-domain representations into a frequency-domain representation;
    based on the frequency-domain representations, sequentially determining equalization parameter to equalize the multipath signal components for each of the analyzed channel parameters;
    sequentially applying the equalization parameters to corresponding signal segments of the digitized signal and multipath signal components so as to equalize the multipath signal components; and
    sequentially aligning an earliest-in-time signal component with equalized multipath signal components based on the analyzed channel parameters for the earliest-in-time signal component.

10. The dynamic equalization method of claim 9, further comprising, based on the frequency-domain representations, sequentially determining the analyzed channel parameters for the earliest-in-time signal component channel parameters corresponding to the signal.

11. The dynamic equalization method of claim 10, wherein the analyzed channel parameters for the earliest-in-time signal for a signal segment are determined based on a position or amplitude of those parameters in the frequency-domain representation for that signal segment.

12. The dynamic equalization method of claim 9, further comprising sequentially demodulating the aligned, equalized signal segments so as to obtain a time-domain representation corresponding to the signal.

13. The dynamic equalization method of claim 9, wherein the equalization parameters for each of the analyzed channel parameters of a signal segment are determined by calculating a filter that equalizes the multipath signal components for each of the analyzed channel parameters in that signal segment.

14. The dynamic equalization method of claim 13, wherein applying the equalization parameters to the signal segment comprises applying the filter to the signal segment.

15. The dynamic equalization method of claim 9, wherein the channel parameters are analyzed and locked to based on a priori known information about the signal.

16. The dynamic equalization method of claim 9, wherein the signal comprises a sequence of blocks each having a preamble and data, and wherein n is equal to the length of each of the blocks.

* * * * *